US012620232B2

(12) United States Patent
Mitra et al.

(10) Patent No.: US 12,620,232 B2
(45) Date of Patent: May 5, 2026

(54) SYSTEMS AND METHODS FOR DETECTING FALL EVENTS

(71) Applicant: Sensormatic Electronics, LLC, Boca Raton, FL (US)

(72) Inventors: Abhishek Mitra, Bangalore (IN); Gopi Subramanian, Delray Beach, FL (US); Yash Chaturvedi, Bangalore (IN)

(73) Assignee: Sensormatic Electronics, LLC, Boca Raton, FL (US)

( * ) Notice: Subject to any disclaimer, the term of this patent is extended or adjusted under 35 U.S.C. 154(b) by 262 days.

(21) Appl. No.: 18/479,667

(22) Filed: Oct. 2, 2023

(65) Prior Publication Data

US 2024/0112469 A1     Apr. 4, 2024

Related U.S. Application Data

(60) Provisional application No. 63/378,116, filed on Oct. 3, 2022.

(51) Int. Cl.
*G06V 20/52*     (2022.01)
*G06T 3/60*     (2024.01)
(Continued)

(52) U.S. Cl.
CPC ................ *G06V 20/52* (2022.01); *G06T 3/60* (2013.01); *G06T 7/74* (2017.01); *G06V 10/759* (2022.01);
(Continued)

(58) Field of Classification Search
CPC ...... G06V 20/52; G06V 10/759; G06V 40/10; G06V 40/20; G06V 40/23; G06T 3/60; G06T 7/74; G06T 2207/30196
See application file for complete search history.

(56) References Cited

U.S. PATENT DOCUMENTS 11,995,917 B2     5/2024   Celi et al.
2015/0109442 A1*   4/2015   Derenne ................ H04N 7/185
                                              348/143
2024/0112469 A1     4/2024   Mitra et al.

FOREIGN PATENT DOCUMENTS

CN       111582158 A       8/2020
CN       111881898 B      11/2020
(Continued)

OTHER PUBLICATIONS

International Search Report and Written Opinion in PCT/US2023/075859, mailed Jan. 8, 2024, 13 pages.

*Primary Examiner* — Delomia L Gilliard
(74) *Attorney, Agent, or Firm* — ArentFox Schiff LLP

(57) ABSTRACT

Example implementations include a method, apparatus and computer-readable medium for computer vision detection of a fall event, comprising detecting a person in a first image captured at a first time. The implementations further include identifying a plurality of keypoints on the person in an image, wherein the plurality of keypoints, when connected, indicate a pose of the person. Additionally, the implementations further include detecting, using the plurality of keypoints, that the person has fallen in response to determining that, subsequent to the pose being the standing pose in a previous image, the keypoints of the plurality of keypoints associated with the shoulders of the person are higher than the keypoints of the second plurality of keypoints associated with the eyes and the ears of the person in the second image. Additionally, the implementations further include generating an alert indicating that the person has fallen.

18 Claims, 16 Drawing Sheets

(51) Int. Cl.

| | | |
|---|---|---|
| *G06T 7/73* | (2017.01) | |
| *G06V 10/75* | (2022.01) | |
| *G06V 40/10* | (2022.01) | |

(52) U.S. Cl.

CPC .... *G06V 40/10* (2022.01); *G06T 2207/30196* (2013.01)

(56) References Cited

FOREIGN PATENT DOCUMENTS

| | | | | | | |
|---|---|---|---|---|---|---|
| CN | 112287759 | A | 1/2021 | | | |
| CN | 109919132 | B | 4/2021 | | | |
| CN | 113392765 | A | 9/2021 | | | |
| CN | 112215185 | B | 8/2022 | | | |
| CN | 115862138 | A | 3/2023 | | | |
| CN | 111680613 | B | 4/2023 | | | |
| CN | 116189238 | B | 7/2023 | | | |
| CN | 116416571 | A | 7/2023 | | | |
| CN | 117218721 | A | 12/2023 | | | |
| CN | 117576780 | A | 2/2024 | | | |
| CN | 118038537 | A | 5/2024 | | | |
| CN | 118840786 | A | 10/2024 | | | |
| CN | 118840786 | B | 1/2025 | | | |
| CN | 120048005 | B | 7/2025 | | | |
| CN | 117115905 | B | 8/2025 | | | |
| CN | 120431622 | A | 8/2025 | | | |
| CN | 120544274 | A | 8/2025 | | | |
| EP | 3309748 | A1 | * | 4/2018 | .......... | G08B 21/043 |
| IN | 202417054426 | | 12/2024 | | | |
| IN | 202541038395 | | 5/2025 | | | |
| JP | 2022016979 | A | * | 1/2022 | | |
| WO | 2021/025958 | A1 | 2/2021 | | | |
| WO | 2023/138445 | A1 | 7/2023 | | | |
| WO | 2023/141381 | A1 | 7/2023 | | | |
| WO | 2024/077005 | A1 | 4/2024 | | | |

* cited by examiner

Shoulder keypoints 704 keypoint projections 706

Ears and eyes keypoints 702

700

1300

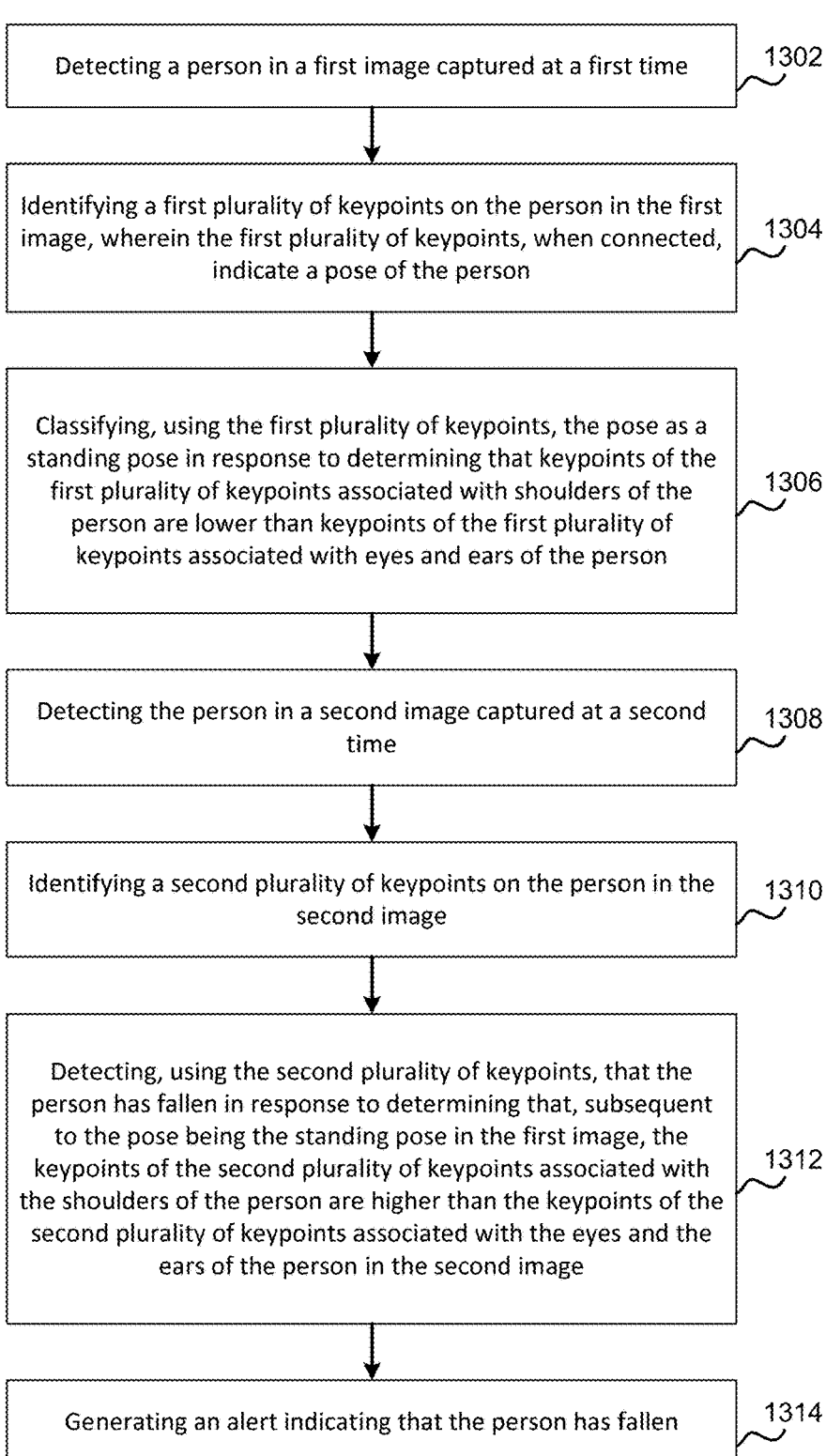

Detecting a person in a first image captured at a first time ⟨1302

Identifying a first plurality of keypoints on the person in the first image, wherein the first plurality of keypoints, when connected, indicate a pose of the person ⟨1304

Classifying, using the first plurality of keypoints, the pose as a standing pose in response to determining that keypoints of the first plurality of keypoints associated with shoulders of the person are lower than keypoints of the first plurality of keypoints associated with eyes and ears of the person ⟨1306

Detecting the person in a second image captured at a second time ⟨1308

Identifying a second plurality of keypoints on the person in the second image ⟨1310

Detecting, using the second plurality of keypoints, that the person has fallen in response to determining that, subsequent to the pose being the standing pose in the first image, the keypoints of the second plurality of keypoints associated with the shoulders of the person are higher than the keypoints of the second plurality of keypoints associated with the eyes and the ears of the person in the second image ⟨1312

Generating an alert indicating that the person has fallen ⟨1314

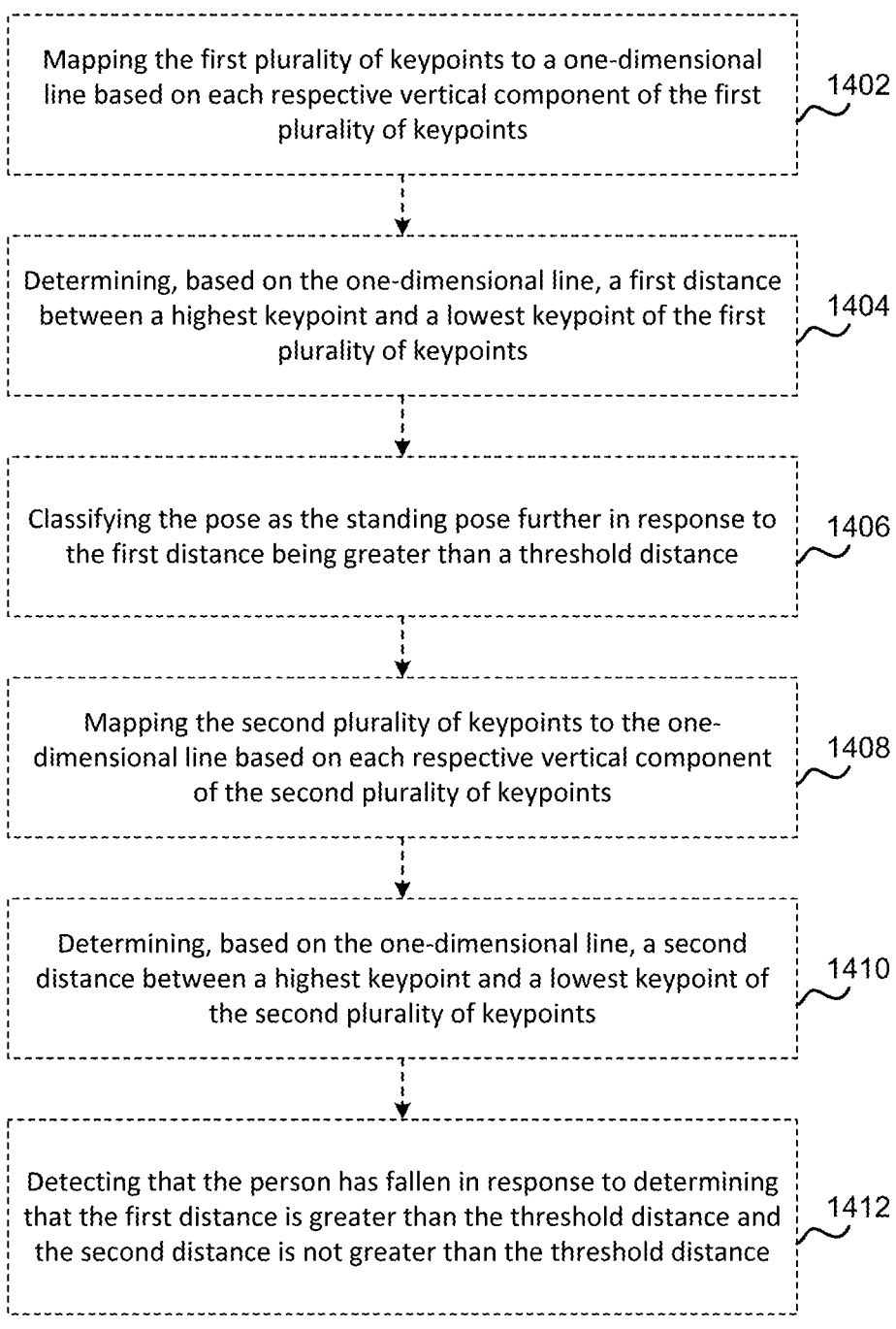

Mapping the first plurality of keypoints to a one-dimensional line based on each respective vertical component of the first plurality of keypoints          1402

Determining, based on the one-dimensional line, a first distance between a highest keypoint and a lowest keypoint of the first plurality of keypoints          1404

Classifying the pose as the standing pose further in response to the first distance being greater than a threshold distance          1406

Mapping the second plurality of keypoints to the one-dimensional line based on each respective vertical component of the second plurality of keypoints          1408

Determining, based on the one-dimensional line, a second distance between a highest keypoint and a lowest keypoint of the second plurality of keypoints          1410

Detecting that the person has fallen in response to determining that the first distance is greater than the threshold distance and the second distance is not greater than the threshold distance          1412

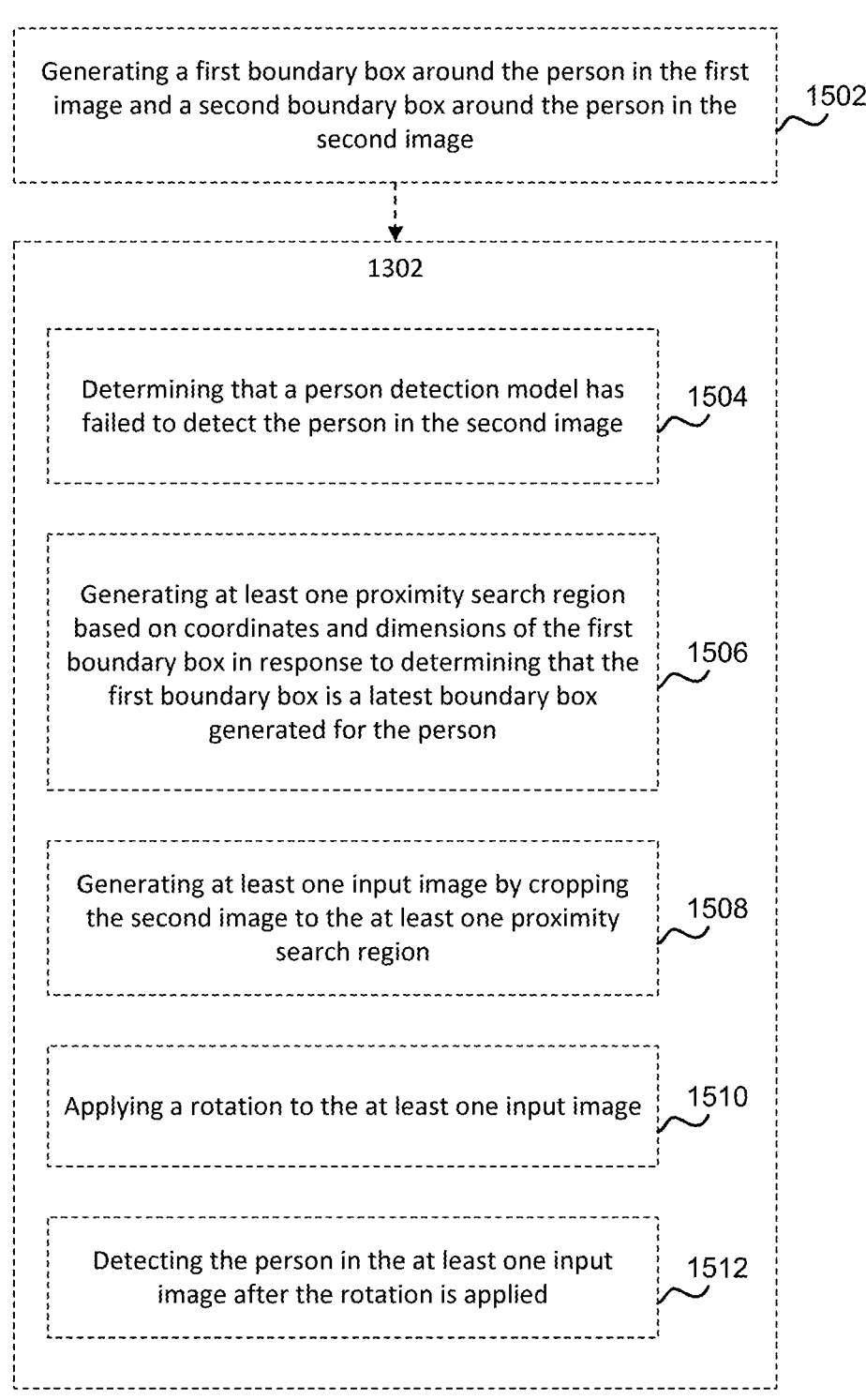

Generating a first boundary box around the person in the first image and a second boundary box around the person in the second image    1502

1302

Determining that a person detection model has failed to detect the person in the second image    1504

Generating at least one proximity search region based on coordinates and dimensions of the first boundary box in response to determining that the first boundary box is a latest boundary box generated for the person    1506

Generating at least one input image by cropping the second image to the at least one proximity search region    1508

Applying a rotation to the at least one input image    1510

Detecting the person in the at least one input image after the rotation is applied    1512

Transmitting the alert to a computing device          1602

SYSTEMS AND METHODS FOR DETECTING FALL EVENTS

CLAIM OF PRIORITY

The present Application for Patent claims priority to U.S. Provisional Application No. 63/378,116 entitled filed on Oct. 3, 2022, and assigned to the assignee hereof and hereby expressly incorporated by reference.

TECHNICAL FIELD

The described aspects relate to fall event detection systems.

BACKGROUND

Fall events result in more than 2.8 million injuries treated in emergency departments annually, including over 800,000 hospitalizations and more than 27,000 deaths. Early fall detection ensures prompt notification to and quick response from the health professionals thereby reducing negative outcome of the accident/fall event.

Conventional systems often fail to provide timely detection and timely recognition of the fall event. This results in delayed alerts that may not be recognized by security personnel as being emergencies. Accordingly, there exists a need for improvements in conventional fall event detection systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method for computer vision detection of a fall event, comprising detecting a person in a first image captured at a first time. The method further includes identifying a first plurality of keypoints on the person in the first image, wherein the first plurality of keypoints, when connected, indicate a pose of the person. Additionally, the method further includes classifying, using the first plurality of keypoints, the pose as a standing pose in response to determining that keypoints of the first plurality of keypoints associated with shoulders of the person are lower than keypoints of the first plurality of keypoints associated with eyes and ears of the person. Additionally, the method further includes detecting the person in a second image captured at a second time. Additionally, the method further includes identifying a second plurality of keypoints on the person in the second image. Additionally, the method further includes detecting, using the second plurality of keypoints, that the person has fallen in response to determining that, subsequent to the pose being the standing pose in the first image, the keypoints of the second plurality of keypoints associated with the shoulders of the person are higher than the keypoints of the second plurality of keypoints associated with the eyes and the ears of the person in the second image. Additionally, the method further includes generating an alert indicating that the person has fallen.

Another example aspect includes an apparatus for computer vision detection of a fall event, comprising at least one memory and one or more processors coupled with the one or more memories and configured, individually or in combination, to: detect a person in a first image captured at a first time. The at least one processor is further configured to identify a first plurality of keypoints on the person in the first image, wherein the first plurality of keypoints, when connected, indicate a pose of the person. Additionally, the at least one processor further configured to classify, using the first plurality of keypoints, the pose as a standing pose in response to determining that keypoints of the first plurality of keypoints associated with shoulders of the person are lower than keypoints of the first plurality of keypoints associated with eyes and ears of the person. Additionally, the at least one processor further configured to detect the person in a second image captured at a second time. Additionally, the at least one processor further configured to identify a second plurality of keypoints on the person in the second image. Additionally, the at least one processor further configured to detect, using the second plurality of keypoints, that the person has fallen in response to determining that, subsequent to the pose being the standing pose in the first image, the keypoints of the second plurality of keypoints associated with the shoulders of the person are higher than the keypoints of the second plurality of keypoints associated with the eyes and the ears of the person in the second image. Additionally, the at least one processor further configured to generate an alert indicating that the person has fallen.

Another example aspect includes an apparatus for computer vision detection of a fall event, comprising means for detecting a person in a first image captured at a first time. The apparatus further includes means for identifying a first plurality of keypoints on the person in the first image, wherein the first plurality of keypoints, when connected, indicate a pose of the person. Additionally, the apparatus further includes means for classifying, using the first plurality of keypoints, the pose as a standing pose in response to determining that keypoints of the first plurality of keypoints associated with shoulders of the person are lower than keypoints of the first plurality of keypoints associated with eyes and ears of the person. Additionally, the apparatus further includes means for detecting the person in a second image captured at a second time. Additionally, the apparatus further includes means for identifying a second plurality of keypoints on the person in the second image. Additionally, the apparatus further includes means for detecting, using the second plurality of keypoints, that the person has fallen in response to determining that, subsequent to the pose being the standing pose in the first image, the keypoints of the second plurality of keypoints associated with the shoulders of the person are higher than the keypoints of the second plurality of keypoints associated with the eyes and the ears of the person in the second image. Additionally, the apparatus further includes means for generating an alert indicating that the person has fallen.

Another example aspect includes a computer-readable medium having instructions stored thereon for computer vision detection of a fall event, wherein the instructions are executable by one or more processors, individually or in combination, to detect a person in a first image captured at a first time. The instructions are further executable to identify a first plurality of keypoints on the person in the first image, wherein the first plurality of keypoints, when connected, indicate a pose of the person. Additionally, the instructions are further executable to classify, using the first plurality of keypoints, the pose as a standing pose in response to determining that keypoints of the first plurality of keypoints associated with shoulders of the person are lower than keypoints of the first plurality of keypoints associated with eyes and ears of the person. Additionally, the instructions are further executable to detect the person in a second image captured at a second time. Additionally, the instructions are further executable to identify a second plurality of keypoints on the person in the second image. Additionally, the instructions are further executable to detect, using the second plurality of keypoints, that the person has fallen in response to determining that, subsequent to the pose being the standing pose in the first image, the keypoints of the second plurality of keypoints associated with the shoulders of the person are higher than the keypoints of the second plurality of keypoints associated with the eyes and the ears of the person in the second image. Additionally, the instructions are further executable to generate an alert indicating that the person has fallen.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 13 is a flowchart of an example of a method for computer vision detection of a fall event;

FIG. 14 is a flowchart of additional aspects of the method of FIG. 13;

FIG. 15 is a flowchart of additional aspects of the method of FIG. 13; and

DETAILED DESCRIPTION

Figure 1:
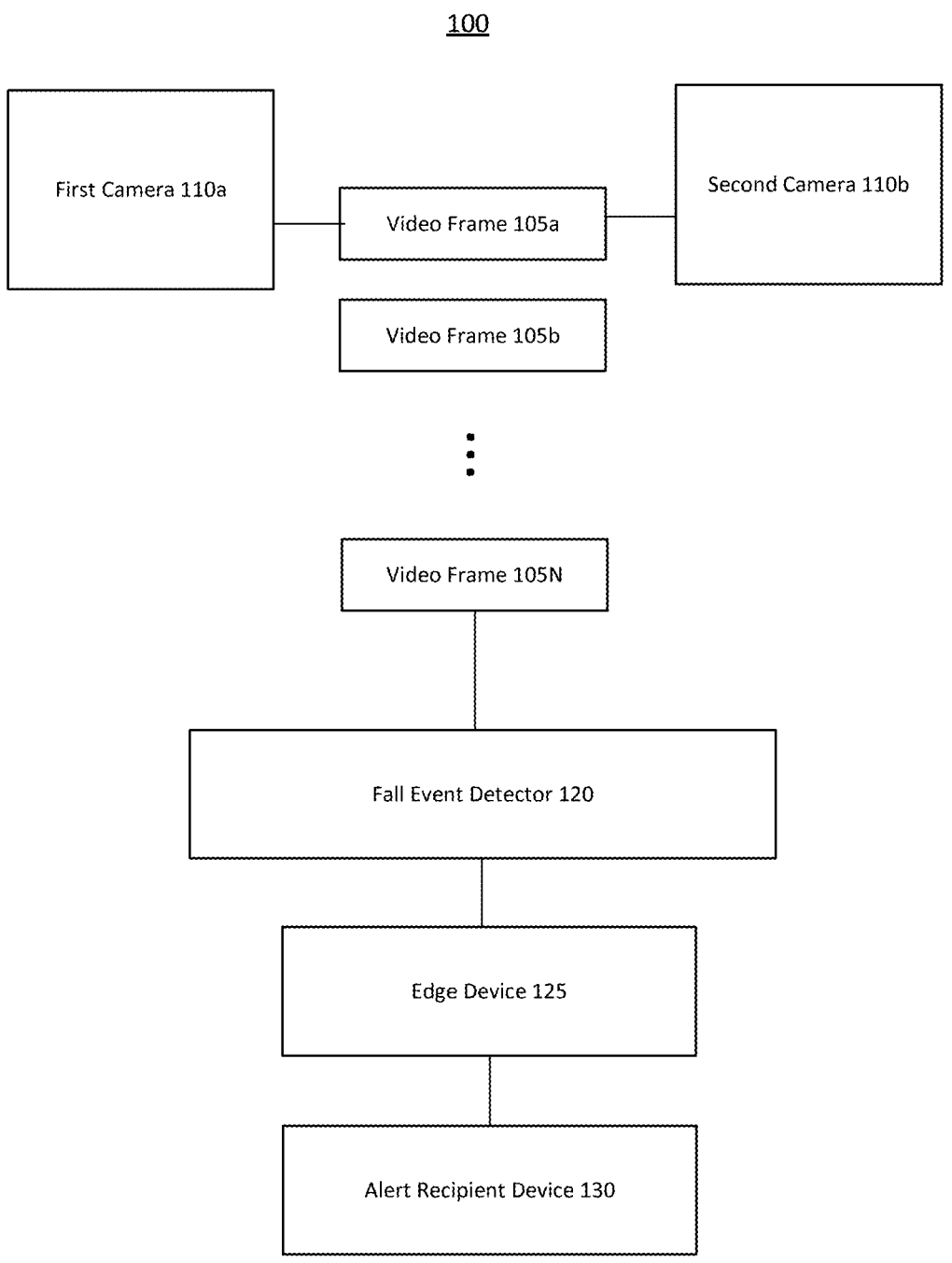
FIG. 1 is a diagram of a system for detecting a fall event, in accordance with exemplary aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Slip/trip and fall accidents can occur in a retail environment for a number of different reasons. For instance, a storeowner may neglect to pick up product(s) that fell on the floor, which may cause an unaware person to trip over the product(s). In another example, a custodian for the environment may mop the floor and forget to place a "wet floor" sign, which triggers a fall event.

Vision systems may be used to detect objects in an environment and track the objects within a region of interest. In some implementations, for example, vision systems may include object detection and tracking capabilities. For instance, in some cases, the object may be a person, and the object tracking may be used for determining whether current pose of a person amounts to a fall event. Detection of fall event is important for fields such as security, injury prevention, reduction of financial liability, reduction of damage to reputation of an institution, retail stores, investigators, etc. For example, a user of a security system may be interested in knowing when people enter and exit a region of interest. A camera (such as an Internet Protocol (IP) camera) may be used to monitor the region of interest, track people as they traverse in and out of the region of interest, and detect when a person may have fallen. If an event occurs within an area being monitored, timely intervention may assist in reducing injury, liability, etc.

Fake slip and fall claims cause shopping malls substantial financial losses. Collecting video evidence through camera-based fall detection is one of the most effective ways of discovering staged accidents and preventing fraudulent insurance pay-outs.

Existing approaches to detecting falls employ deep learning models (e.g., you-only-look-once (YOLO) models), which are either trained on fallen person images or fallen person pose keypoints. However, such models require heavy processing and are not suitable to work on edge devices, which are typically capable of only minimal processing.

Because building a custom model from scratch is difficult as custom models require data collection, data annotations, and training, the present disclosure leverages existing person detection and pose estimation models which are meant for edge devices. In particular, these light (i.e., processorfriendly) models are trained on images of persons in standing/bending positions. Such models may be used for detection and pose estimations, and apply image processing techniques and linear algebra for fallen position person detection.

In an exemplary aspect, if a model can detect a person and generates a corresponding bounding box around the person, keypoint detection may be used to detect falls. In particular, the systems and methods of the present disclosure check the shoulder keypoint, ear keypoint, and eye keypoint placement. If the shoulder keypoint is above the ear keypoint or eye keypoint, the person is determined to have fallen.

It should be noted that there are various edge cases in which the shoulder keypoint may be above the ear and eye keypoints even though the person has not fallen (e.g., a person may bend over briefly). In another example, a person in a retail store may bend to search for a product in a lower shelf. In those cases, due to occlusion, there is a probability that the system cannot detect the prominent keypoints. To avoid these type of scenarios, the present disclosure describes leveraging cross view camera outputs (if available) and analysing person pose keypoints for both cross view camera outputs on a one-dimensional (1-D) projection domain to decide "fall" or "no fall." In particular, the spread of keypoints is considered. For example, keypoints may be widely spread out when a person is standing, and may be narrowly spaced when the person is lying down. In some aspects, pose keypoints on a 1-D projection space may be fed to a heuristic algorithm or binary machine learning (ML) classifier model to classify "fall" or "no fall." The benefits of using a two cross view camera system and proximity search region approach is that the change in spacing of pose keypoints from standing position to falling position will be prominent in either camera view.

In an exemplary aspect, if the model is no longer able to detect a person in an image of a plurality of images (e.g., video frames), the systems and methods of the present disclosure retain an object identifier of the person, and take the last detected bounding box of that person to mark nearby areas as probable fall region (hereinafter referred to as proximity search region). The systems and methods crop the image to the proximity search region and apply transformations (e.g., rotating the cropped image by 45 and 90 degrees clockwise and anti-clockwise). On the rotated images, the model is ran again to detect the person. If detected, the person is identified to have fallen and an alert is generated.

In some aspects, the proximity search region is searched on every nth image of a plurality of images to improve efficiency, where n is an integer that can be configured by an operator of the system. Considering that a person may simply stand up and start walking, the proximity search region is only analysed for a threshold number of frames before being discarded. In a more detailed level, the proximity search region is calculated based on the last detected bounding boxes coordinates (x_top_left, y_top_left, width, height) of the tracked object. Based on the above coordinates, the bottom coordinates are derived—creating two proximity search regions. The first search region (default) is the last detected bounding box region. The second region is the expanded form of the first region where the approximate height of the person is treated as the width of the region and the approximate width of the person is used as the height for the region.

In some aspects, additional search regions may be derived by tracking the identifier and trajectory of the person. The proximity search region may be any shape (e.g., a rectangle, a circle with radius (Rp) around the bottom coordinates of the last detected bounding box, etc.).

The advantages of the systems and methods of the present disclosure are as follows. The systems and methods: do not require additional hardware such as wearable devices to detect falls, do not require any kind of data collection, annotation, and training of a model, leverage existing infrastructure and deep learning models which are meant for edge computing, provide real-time results, can be fine-tuned as and when required, can detect the fall action but can also detect if the person is lying down after fall, and are able to detect the person in all positions and require minimal human effort.

FIG. 1 is a diagram of a vision system 100 for detecting a fall event. In one aspect, the vision system 100 may be a single camera-based system comprising either a first camera 110a or a second camera 110b (e.g., internet protocol (IP) cameras). In some other aspects, the vision system 100 may be a multi camera-based system comprising multiple cameras such as the first camera 110a, the second camera 110b, and/or any other additional cameras. Furthermore, the vision system 100 may comprise a fall event detector 120, which is executed on an edge device (e.g., a computer), and an alert recipient 130 (e.g., a smartphone). The communication between the edge device 125 and the alert recipient 130 may be performed via a communication network (Internet, 4G/5G network, enterprise network, or any other standard network). The fall event detector 120 may be implemented as a module of the at least one IP camera 110a, or 110b or on another device (e.g., server) communicatively coupled to at least one of the IP cameras 110a, 110b for receiving video streams from the at least one IP camera 110a, or 100b. The video stream includes a plurality of data frames such as video frames 105a-105N and/or image frames. For example, the IP cameras may capture 30 data frames per second. Then, for each second, the video stream includes the 30 captured data frames.

Figure 2:
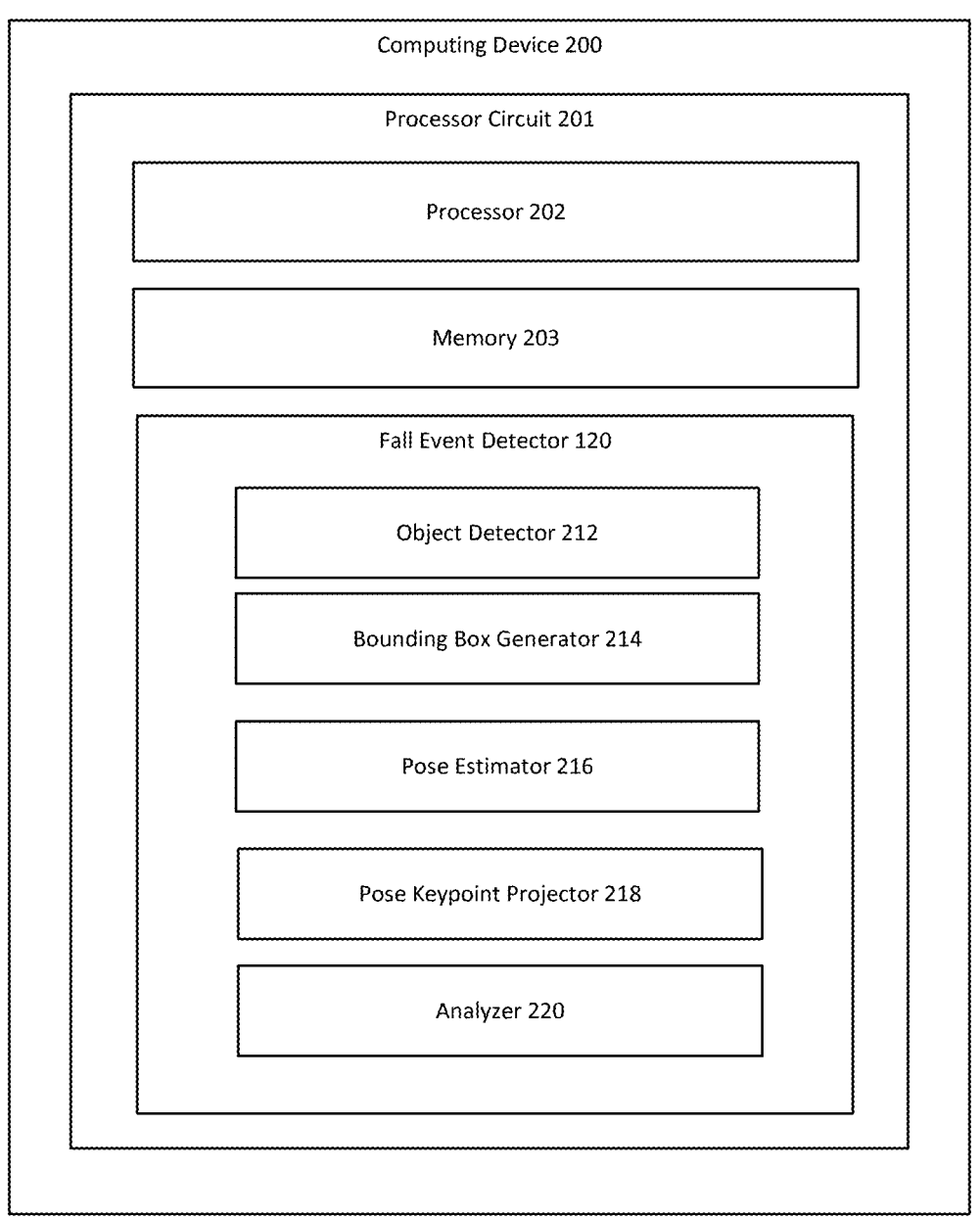
FIG. 2 is a block diagram of a computing device for detecting a fall event, in accordance with exemplary aspects of the present disclosure.

FIG. 2 is a block diagram of a computing device 200 for detecting a fall event. The computing device 200 may comprise a processing circuit 201 having a processor 202, a memory 203 and the fall event detector 120. For example, the fall event detector 120 may be implemented in an computing device 200. In one aspect, the computing device 200 may be part of at least one of first camera 110a, second camera 110b or can be separate from the cameras 110a, 110b. In another aspect, the components of the computing device 200 can be in a server. In yet another aspect, the vision system 100 may include a single computing device 200 that is configured to cooperate with at least one of the first camera 110a and the second camera 110b.

The computing device 200 (e.g., edge device 125) may include object detector 212, bounding box generator 214, pose estimator 216 for estimating poses of object(s), pose keypoint projector 218, and an analyzer 220.

The object detector 212 is basically a person detector that is configured to receive the data frames generated by at least one of the first camera 110a and the second camera 110b. The object detector 212, in some exemplary aspects, employs Artificial Intelligence (AI) and/or Machine Learning (ML) based techniques to identify one or more objects within the received data frames. In some exemplary aspects, the object detector 212 utilizes one or more image processing techniques to identify objects. The object detector 212 may be configured to determine Region of Interest (ROI) within the data frame to determine and locate an object within the ROI. The ROI may be the entire data frame being captured by the camera(s) 110a, 110b or a portion of the data frame, as set by the user. The object may be detected using an object detection software as known in the art and executed by the processor 202.

Still referring to FIG. 2, the object detector 212 may use an object tracking software. For example, as the object moves within the region of interest, the object detector tracks the object by comparing images of the object in a plurality of data frames. The software for detecting and tracking the object may be implemented together or separately in different components of at least one of the IP cameras 110*a*, or 110*b* or by the computing device 200 communicatively coupled with at least one of the IP cameras 110*a*, 110*b*. Moreover, tracking of the object may be performed by the processor 202 (e.g., executing tracking software).

The computing device 200 is further shown to include the bounding box generator 214. The bounding box generator 214 is configured to coordinate with the object detector 212 to generate a bounding box (not shown in figures) around the object(s) detected by the object detector 212. For clarity, the bounding boxes around the object(s) indicates people identified within a data frame. In other words, the bounding box also represents location of person or object within the data frame.

Sill referring to FIG. 2, the bounding box generator 214 tags each of the bounding boxes with a unique identifier, where each bounding box corresponds to a single object identified within the data frame. In other words, the unique identifier is also associated with the object within the bounding box. The count of bounding boxes generated and/or count of unique identifier generated corresponds to the number of objects identified in a particular data frame. In the present disclosure, the objects may be identified or referred by unique identifiers. The objects may be identified based on the unique identifier tagged with the respective bounding boxes.

In an exemplary aspect, the vision system 100 is capable of establishing a correlation between bounding boxes generated for the same object identified by multiple cameras within their respective data frames. This allows the vision system 100 to keep track of the objects from different angles or views. For an example, object 1 may be visible within the data frames generated by the first camera 110*a* and the second camera 110*b*. Such objects can also be associated with a single unique identifier. In another aspect, different unique identifier may be allotted to the bounding boxes generated by the bounding box generator 214 of both first camera 110*a* and second camera 110*b*.

The computing device 200 is further shown to include pose estimator 216. In one aspect, the pose estimator 216 may apply pose estimation technique on an entire data frame. Alternatively, in some aspects, the pose estimator 216 may apply pose estimating technique on the bounding boxes generated by the bounding box generator 214. The pose estimation technique may be based on one or more Artificial Intelligence (AI) and/or Machine Learning (ML) based technique(s) to estimate a pose of the object. The pose estimator 216 identifies a plurality of keypoints and links them to determine a pose of the object. Furthermore, upon creating linkage between the keypoints, the pose estimator 216 correlates the mapped keypoints with the bounding box.

Further, the pose estimator 216 determines an X coordinate value and a Y coordinate value for each keypoint.

Typically, a single keypoint represents a portion of the object. In some exemplary aspects, the keypoints and their linkage may enable the pose estimator 216 to estimate the current pose of object. For an example, the keypoint(s)

representing shoulders of the object/person should be lower than the keypoint(s) representing eyes and ears in order to estimate that the object is standing. In one other example, the pose estimator 216 may estimate that the object is not in a standing position when keypoint(s) representing shoulder is higher than the keypoint(s) representing eyes and ears.

Still referring to FIG. 2, the pose keypoint projector 218 is configured to cooperate with the pose estimator 216. The pose keypoint projector 218 receives the plurality of keypoints identified for each of the objects within the data frame, and further receives the Y coordinate value for each of the keypoints. In an aspect, the pose keypoint projector 218 is configured to plot keypoint projections based on the received Y-coordinate value. The analyzer 220, of the computing device 200, analyzes these keypoint projections to determine fall event using Artificial Intelligence (AI) or Machine Learning (ML) based technique(s). In one aspect, the analyzer 220 may be configured to identify a change in spacing between the keypoint projections (e.g., shift in keypoint projections in different data frames to detect occurrence of a fall event).

Subsequent to detecting the fall event, one or more alerts may be provided over the alert recipient 130 (e.g., a server, a user device, etc.).

In one aspect, if the vision system 100 is a single camera-based system that comprises only one camera such as second camera 110*b*, then a fall event may be determined based on the analysis performed on the data frame generated by the second camera 110*b*. In this exemplary aspect, the object detector 212 may identify an object within the data frames provided by the second camera 110*b*. The bounding box generator 214 may generate a bounding box around the object. The pose estimator 216 may estimate a current pose of the object by identifying and connecting a plurality of keypoints associated with the object. Further, the pose keypoint projector 218 may generate keypoint projections of the object by plotting the keypoints in at least one dimension. The analyzer 220 may detect a fall event associated with the object by analyzing keypoint projections of the data frames provided only by the second camera 110*b*. Thus, the fall event can be determined by the vision system 100 by using a single camera.

As referred above, although the vision system 100 may determine the fall event by using only one camera, in some aspects, using more than one camera such as the first camera 110*a* and the second camera 110*b* may provide better accuracy in determining fall events as shift in keypoint projections from standing pose to falling pose will be prominent in either of camera views of the two cameras 110*a* or 110*b*. In this scenario, the first camera 110*a* and the second camera 110*b* may be positioned substantially orthogonal to each other and camera view or field of view (FOV) of the first camera 110*a* may at least partially overlap with the camera view of the second camera 110*b*. In such case, if a person is falling along a lateral direction in a camera view of the first camera 110*a*, then the data frame provided by the first camera 110*a* may depict significant changes in spacing of keypoint projections (on 1-D projection space) for the falling person as compared to the camera view of the second camera 110*b*, where the person is falling in a longitudinal direction. Thus, the fall event may be detected with a higher confidence level in either of camera views for the two cameras 110*a* or 110*b*. Additionally, increasing the count of cameras may enhance accuracy of fall detection event.

In some other aspects, the vision system 100 may comprise multiple cameras where the field of view (FOV) of at least two cameras may partially overlap or may not overlap. In some scenarios, the vision system 100 may be configured to generate a confidence score pertaining to fall detection event. The confidence score can be, at least, based on the detection of object's fall event within overlapping FOV or non-overlapping FOV.

In one aspect of the present disclosure, the vision system 100 comprises multiple cameras such as the first camera 110*a* and the second camera 110*b*. The object detector 212 may receive a plurality of first data frames provided by the first camera 110*a* and a plurality of second data frames provided by the second camera 110*b*. Further, the object detector 212 may identify an object within at least one of the first data frames and the second data frames. The bounding box generator 214 may generate a bounding box around the object. The pose estimator 216 may estimate a current pose of the object by identifying and connecting a plurality of keypoints associated with the object. Further, the pose keypoint projector 218 may generate keypoint projections of the object by plotting the keypoints in at least one dimension. The analyzer 220 may detect a fall event associated with the object by analyzing keypoint projections of at least one of the first data frames and second data frames.

Figure 3:
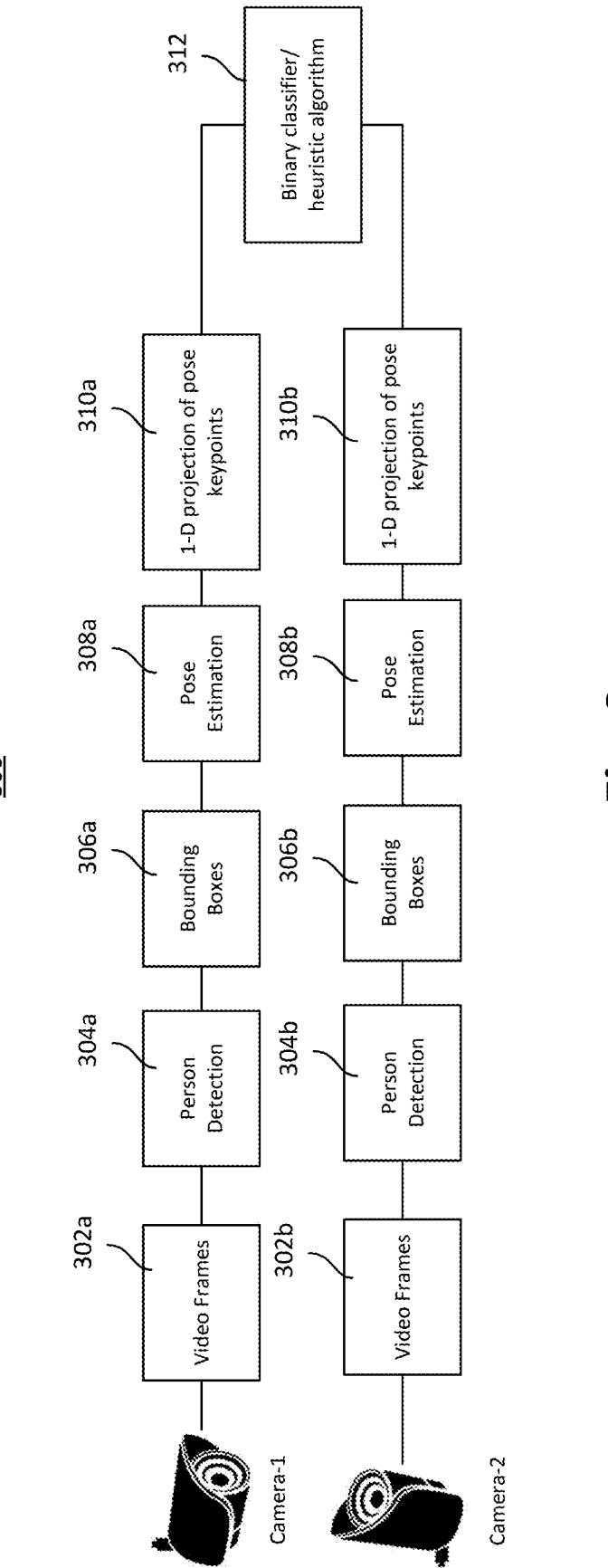
FIG. 3 is a flowchart illustrating a method for detecting a fall event, in accordance with exemplary aspects of the present disclosure.

Now referring to FIG. 3, flowchart illustrating method 300 for detecting a fall event, is shown in accordance with exemplary aspects of the present disclosure. In some aspects, the method 300 is performed by an computing device 200 deployed in the first camera 110*a* and second camera 110*b*. Alternatively, the method 300 may be performed by an computing device 200 deployed on a server.

The method 300 is shown to include receiving, at 302*a*, one or more video streams from a first camera 110*a*. The video streams may include a plurality of data frames such as video frames and/or image frames.

Further, the method 300 is shown to include detecting, at 304*a*, one or more persons in the data frames. In some aspects, the one or more persons may be detected by the object detector 212 (referred above in FIG. 2) which is basically a person detector that is configured to receive the data frames generated from the first camera 110*a*. In some exemplary aspects, Artificial Intelligence (AI) and/or Machine Learning (ML) based techniques may be employed to identify one or more objects within the received data frame. In some exemplary aspects, one or more image processing techniques may be employed to identify objects. Also, a ROI within the data frame may be detected to determine and locate an object within the region of interest. The ROI may be the entire data frame being captured by the camera(s) 110*a*, 110*b* or a portion of the data frame, as set by the user. The object may be detected using an object detection software as known in the art and executed by the processor 202.

In some aspects, an object tracking software may be used to track objects within the data frame. For example, as the object moves within the ROI, the object may be tracked by comparing images of the object in a plurality of data frames. The software for detecting and tracking the object may be implemented together or separately in different components of the first camera 110*a* or by the computing device 200 communicatively coupled with the first camera 110*a*. Moreover, tracking of the object may be performed by the processor 202 (e.g., executing tracking software as known in the art).

Further, the method 300 is shown to include generating, at 306*a*, one or more bounding boxes. In some aspects, the bounding boxes may be generated by the bounding box generator 214 (referred above in FIG. 2). The bounding box (not shown in figures) may be generated around the object(s) detected by the object detector 212. For clarity, the bounding boxes around the object(s) indicates people identified within a data frame. In other words, the bounding box also represents location of person or object within the data frame.

In some aspects, each of the bounding boxes may be tagged with a unique identifier, where each bounding box corresponds to a single object identified within the data frame. In other words, the unique identifier is also associated with the object within the bounding box. Therefore, the count of bounding boxes generated and/or count of unique identifier generated corresponds to the number of objects identified in a particular data frame. In the present disclosure, the objects may be identified or referred by unique identifiers. The objects may be identified based on the unique identifier tagged with the respective bounding boxes.

In an exemplary aspect, a correlation between bounding boxes generated for the same object identified by multiple cameras such as 110*a*, 110*b* within their respective data frames may be established. Thereby, allowing tracking of the objects from different angles or views. For an example, object 1 may be visible within the data frames generated by the first camera 110*a* and the second camera 110*b*. Such objects can be associated with a single unique identifier. In another aspect, different unique identifier may be allotted to the bounding boxes generated by the bounding box generator 214 of both cameras i.e., the first camera 110*a* and the second camera 110*b*.

The method 300 is further shown to include estimating, at 308*a*, a pose for the objects. In some aspects, pose estimation may be performed by the pose estimator 216 (referred above in FIG. 2). In one aspect, a post estimation technique may be applied on an entire data frame received from the first camera 110*a*. Alternatively, in some aspects, the pose estimation technique may be applied on the bounding boxes generated by the bounding box generator 214. The pose estimation technique may be based on one or more Artificial Intelligence (AI) and/or Machine Learning (ML) based technique(s) to estimate a pose of the object. A plurality of keypoints may be identified and linked to determine a pose of the object. Furthermore, upon creating linkage between the keypoints, the mapped keypoints may be correlated with the bounding box.

Further, an X coordinate value and a Y coordinate value for each keypoint may be determined.

Typically, a single keypoint represents a portion of the object. In some exemplary aspects, the keypoints and their linkage may enable estimation of the current pose of the object. For an example, the keypoint(s) representing shoulders of the object/person should be lower than the keypoint(s) representing eyes and ears in order to estimate that the object is standing. In one other example, it may be estimated that the object is not in a standing position when keypoint(s) representing shoulder is higher than the keypoint(s) representing eyes and ears.

The method 300 is further shown to include projecting, at 310*a*, the keypoints. In some aspects, the keypoints may be projected by the pose keypoint projector 218 (referred above in FIG. 2). As referred above, the X coordinate value and Y coordinate value for each keypoint may be determined. In an aspect, the keypoint projections may be plotted based on the Y-coordinate value of the keypoint. Further, the keypoint projections may be analyzed, at 312, by the analyzer 220 (referred above in FIG. 2) using Artificial Intelligence (AI) or Machine Learning (ML) based technique(s) such as binary classifiers, heuristic algorithms etc., to determine a fall event associated with the object. In some aspects, the fall event may be indicated in form of percentage, for example Fall—90%, No fall—10%, or in any other form.

Further, upon detecting the fall event, one or more alerts may be provided over the alert recipient 130 (e.g., a server, user device).

Similarly, the method 300 is shown to include receiving, at 302b, one or more video streams from the second camera 110b. The video streams may include a plurality of data frames such as video data frames. The data frames may be received by the computing device 200 that is part of the second camera 110b to detect a fall event by performing the one or more steps (i.e., 304b, 306b, 308b, and 310b) similar to that performed by the computing device 200 that is part of the first camera 110a, as explained above.

Figure 4:
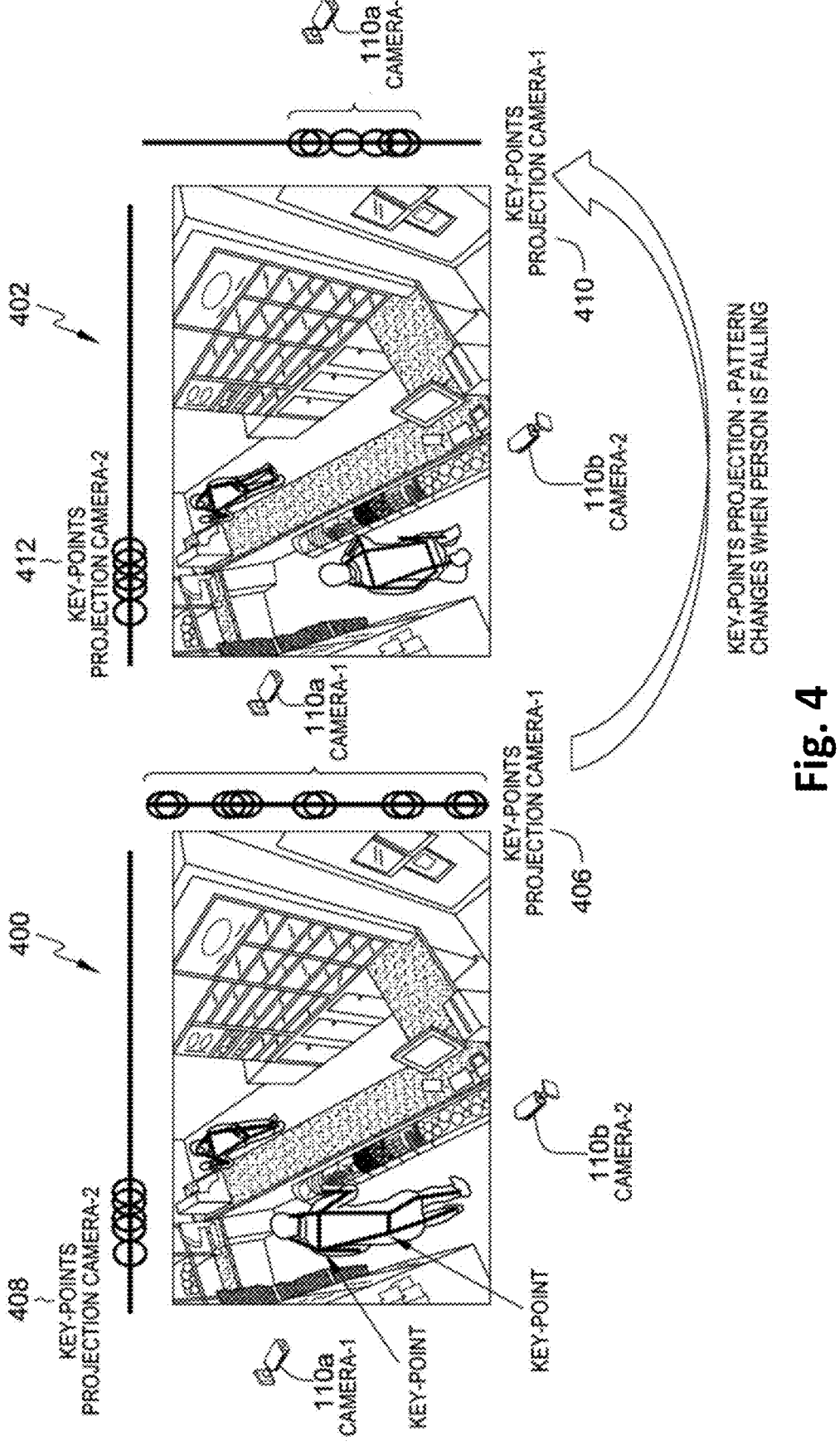
FIG. 4 is a diagram depicting two scenarios captured by a multi camera-based system, where in the first scenario a person is seen to be in a first pose and in a second scenario the person is seen to be in a second pose, in accordance with exemplary aspects of the present disclosure.

Now referring to FIG. 4, a diagram depicting two scenarios captured by a multi camera-based system, where in first scenario 400, a person is seen to be in a first pose and in second scenario 402, the person is seen to be in a second pose, is shown in accordance with exemplary aspects of the present disclosure.

FIG. 4 depicts a first scenario 400 where a person is seen to be in a first pose that is standing pose in a retail environment. The first scenario 400 may be captured by each of the first camera 110a and the second camera 110b of a multi camera-based system. Each of the first camera 110a and the second camera 110b are positioned substantially orthogonal to each other with at least partially overlapping FOV and may provide one or more data frames pertaining to the first scenario 400.

Further, a plurality of keypoints (as shown in first scenario 400) may be identified and linked to determine a pose of the person by the pose estimator 216. Further, keypoint projections may be plotted based on received Y coordinate value of each keypoint. The keypoint projections 406 are generated for the data frame provided by the first camera 110a and the keypoint projections 408 are generated for the data frame provided by the second camera 110b as shown in first scenario 400.

Similarly, the second scenario 402 is shown, where the same person is detected and seen to be in a second pose. The second scenario 402 also may be captured by each of the first camera 110a and the second camera 110b of the multi camera-based system. Each of the first camera 110a and the second camera 110b are positioned substantially orthogonal to each other with at least partially overlapping FOV and may provide one or more data frames pertaining to the second scenario 402. Further, keypoint projections 410 are generated for the data frame provided by the first camera 110a and keypoint projections 412 are generated for the data frame provided by the second camera 110b.

Further, the keypoint projections 406 generated in the first scenario 400 are compared and analyzed with the keypoint projections 410 generated in the second scenario 402. The analysis shows that the keypoint projections 406 in the first scenario 400 are spaced apart or scattered, for example, the keypoint(s) representing shoulders of the person are lower than the keypoint(s) representing eyes and ears suggesting that the person is in standing pose. However, the keypoint projections 410 in the second scenario 402 are clustered. This shift in keypoint projections in different data frames indicates that the person has fallen down, thereby facilitating detection of a fall event.

Similarly, the keypoint projections 408 in the first scenario 400 are compared and analyzed with the keypoint projections 412 in the second scenario 402 in order to detect a fall event.

As referred above, although the vision system 100 may determine a fall event of a person by using only one camera, however, in some aspects, using more than one camera such as the first camera 110a and the second camera 110b provides greater accuracy in determining fall events as change in spacing of keypoint projections from standing pose to falling pose will be prominent in either of camera views of the two cameras 110a or 110b that are positioned substantially orthogonal to each other. For example, the keypoint projections 408 in the first scenario 400 and the keypoint projections 412 in the second scenario 402 are shown for the data frames captured by the second camera 110b. In such case, if only one camera was used, such as the second camera 110b, the fall event may not be accurately determined due to no changes in spacing between keypoint projections 408 and 412 as the person falls. However, using more than one camera such as the first camera 110a along with the second cameral 10b, may help in accurately determining the fall event. For example, the keypoint projections 406 for the first scenario 400 and the keypoint projections 410 for the second scenario 402 are shown for the data frames captured by the first camera 110a and such keypoint projections show significant changes in spacing as the person falls, due to a different camera view as compared to the second camera 110b. Therefore, the vision system 100 utilizing more than one camera may increase a confidence level in determining the fall event.

Figure 5:
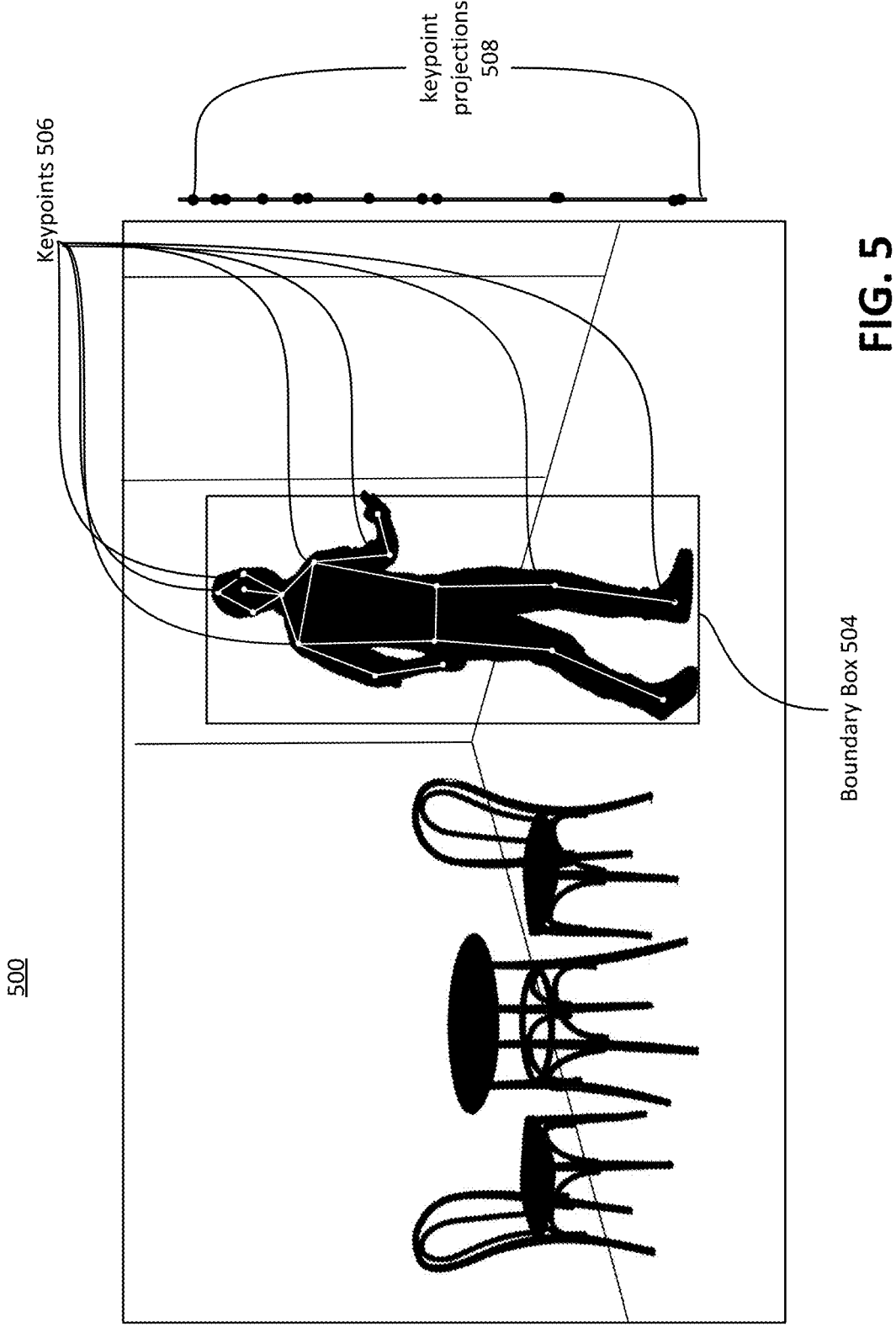
FIG. 5 is a first snapshot demonstrating detection of fall event by utilizing a single camera-based system, in accordance with exemplary aspects of the present disclosure.
Figure 6:
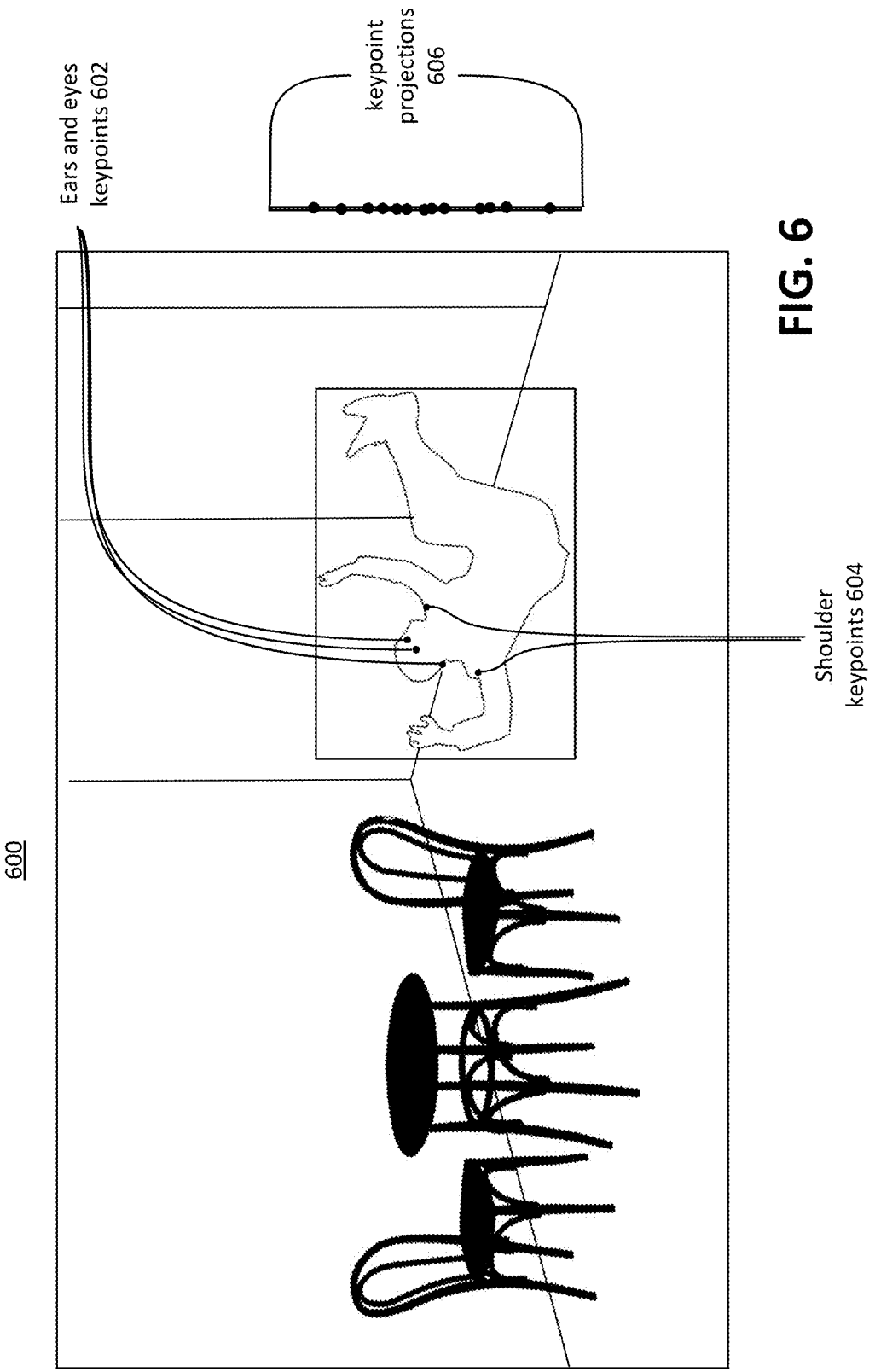
FIG. 6 is a second snapshot demonstrating detection of fall event by utilizing a single camera-based system, in accordance with exemplary aspects of the present disclosure.
Figure 7:
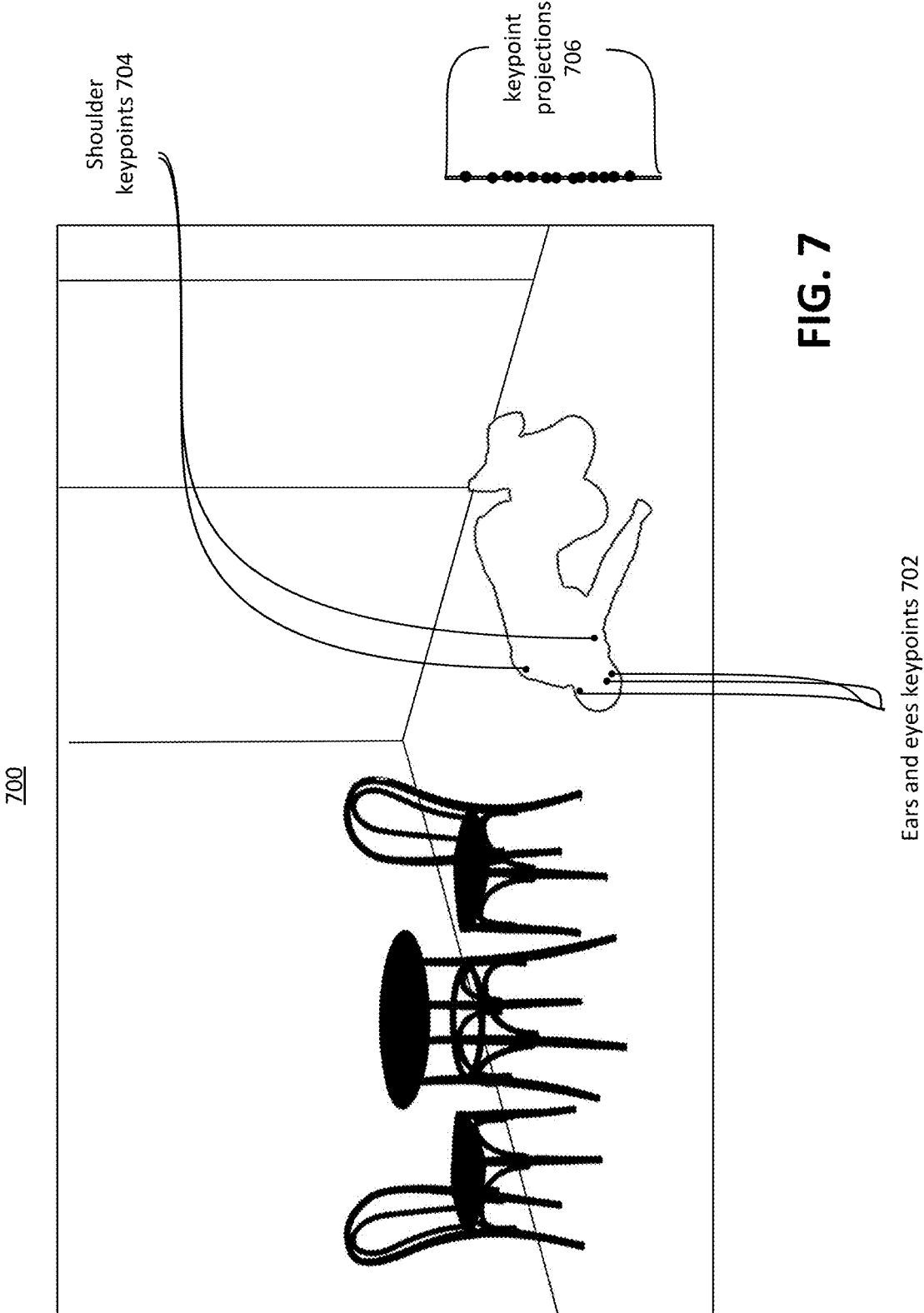
FIG. 7 is a third snapshot demonstrating detection of fall event by utilizing a single camera-based system, in accordance with exemplary aspects of the present disclosure.

Now referring to FIGS. 5-7, snapshots demonstrating detection of fall event by utilizing a single camera-based system, are shown in accordance with exemplary aspects of the present disclosure.

FIG. 5 is a first snapshot 500 demonstrating detection of fall event by utilizing a single camera-based system, in accordance with exemplary aspects of the present disclosure.

A plurality of keypoints 506 may be identified and linked to determine a pose of the person detected in boundary box 504 by the pose estimator 216. Further, the keypoint projections 508 may be plotted based on the received Y-coordinate value of each keypoint. In FIG. 5, keypoint projections 508 are spaced apart.

FIG. 6 is a second snapshot 600 demonstrating detection of fall event by utilizing a single camera-based system, in accordance with exemplary aspects of the present disclosure. In FIG. 6, the person is in the process of falling (e.g., in midfall). Fall event detector 120 again detects the keypoints of the person in snapshot 600. For simplicity, only the ears and eyes keypoints 602 and shoulder keypoints 604 are marked in FIG. 6 and all other keypoints are not marked. In this snapshot 600, fall event detector 120 may not classify that the person has fallen because the shoulder keypoints 604 are lower than ears and eyes keypoints 602. Nonetheless, because the person is falling, keypoint projections 606 show the keypoints condensing in one area relative to the wide spread in keypoint projections 508.

FIG. 7 is a third snapshot 700 demonstrating detection of fall event by utilizing a single camera-based system, in accordance with exemplary aspects of the present disclosure. In FIG. 7, the person has fallen and is lying on the floor. As can be seen, ears and eyes keypoints 702 are below shoulder keypoints 704. Accordingly, fall event detector 120 may classify a fall event. Referring to keypoint projections 706, it can be seen that the keypoints have the shortest spread as compared to keypoint projections 508 and keypoint projections 606. For example, the distance between the highest keypoint and the lowest keypoint along the Y axis is the shortest in keypoint projections 706 from the three projections described in FIGS. 5-7.

More specifically, each of the keypoint projections 508, 606, and 706 are compared and analyzed by the analyzer 220 (referred to above in FIG. 5). The analysis shows that the keypoint projections 508 in FIG. 5 are spaced apart, for example, the keypoint(s) representing shoulders of the person are lower than the keypoint(s) representing eyes and ears, suggesting that the person is standing. However, the keypoint projections 706 shown in subsequent data frames are clustered. This shift in keypoint projections in two or more adjacent data frames indicates that the person has fallen down. In such scenario, when the vision system 100 detects a fall event, one or more alerts may be provided to alert recipient 130 (e.g., a server, user device).

Figure 8:
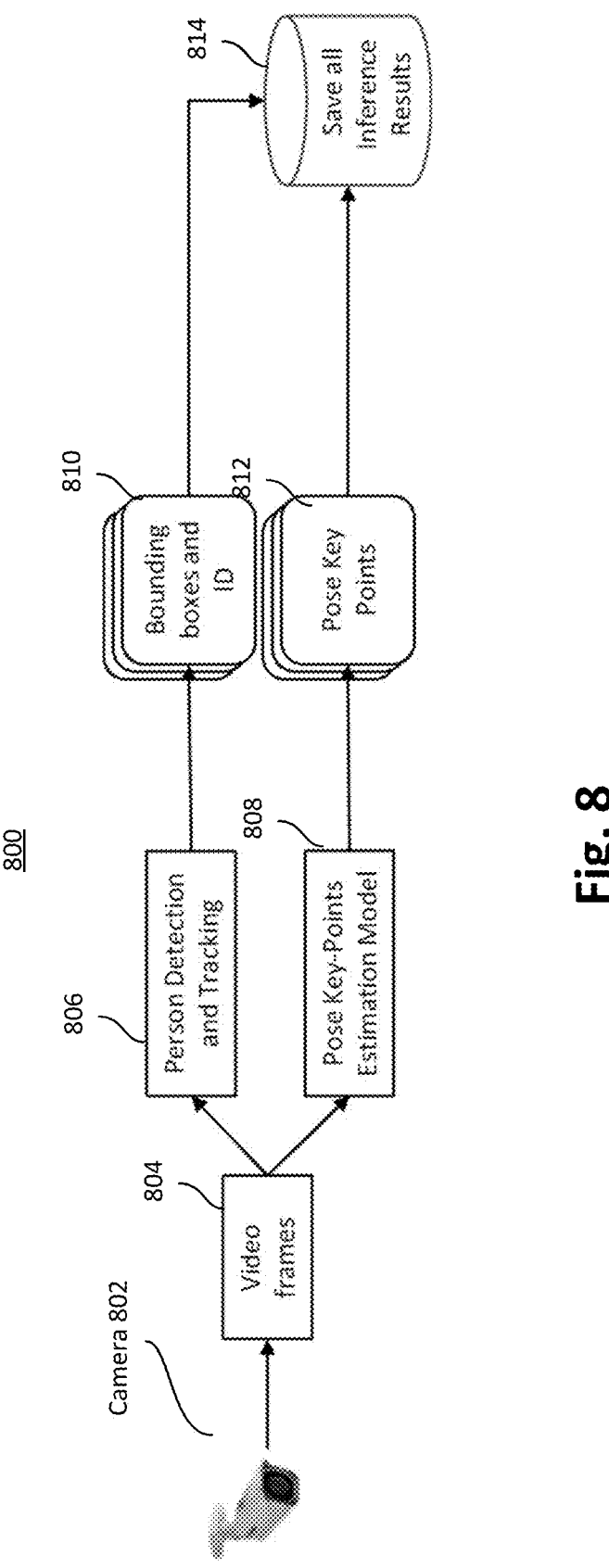
FIG. 8 is a flow diagram for detecting keypoints and generating bounding boxes, in accordance with exemplary aspects of the present disclosure.

FIG. 8 is a flow diagram 800 for detecting keypoints and generating bounding boxes, in accordance with exemplary aspects of the present disclosure. In diagram 800, camera 802 captures video frames 804 (e.g., snapshots 500-700). At 806, fall event detector 120 executes person detection and tracking on video frames 804 and at 808, fall event detector 120 executes a pose keypoints estimation model. These executions result in bounding boxes and identifiers 810 and pose keypoints 812, respectively, which are stored as inference results 814.

Figure 9:
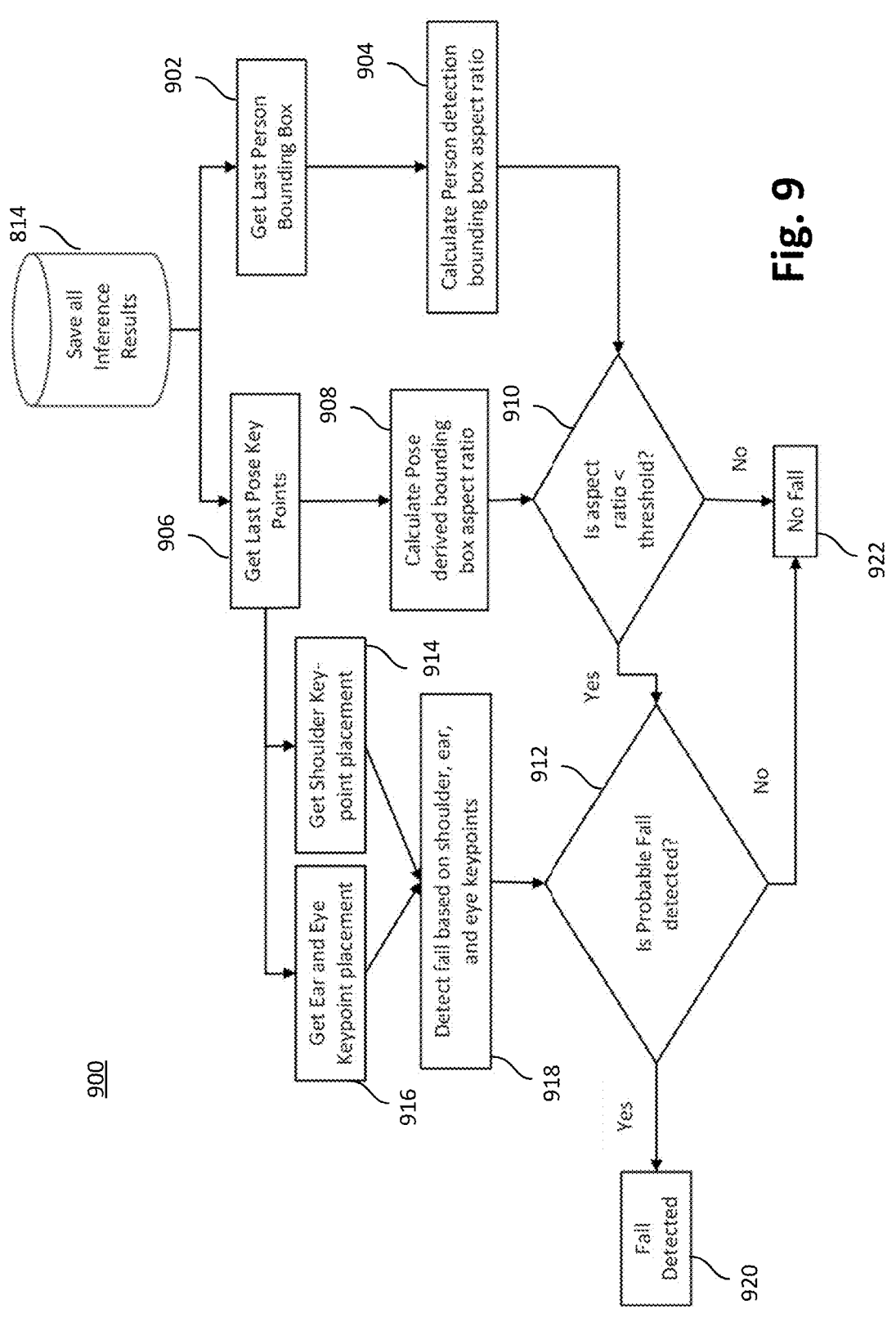
FIG. 9 is a flow diagram for classifying a fall event based on detection of a person, in accordance with exemplary aspects of the present disclosure.

FIG. 9 is a flow diagram 900 for classifying a fall event based on detection of a person, in accordance with exemplary aspects of the present disclosure. Subsequent to saving inference results 814 in memory, if a person is detected in a video frame, diagram 900's steps are initiated. At 902, fall event detector 120 retrieves the last person bounding box. At 904, fall event detector 120 calculates the aspect ratio of the bounding box. At 910, fall event detector 120 determines whether the aspect ratio is less than a threshold aspect ratio. If it is not, at 922, no fall is classified. At 906, fall event detector 120 retrieves the latest pose keypoints of the person. At 908, fall event detector 120 calculates the aspect ratio of the pose-derived bounding box. From 908, diagram 900 proceeds to 910, as described above.

At 914 and 916, fall event detector 120 identifies the ears and eyes keypoints and shoulder keypoints. At 918, fall event detector 120 detects a fall based on the keypoints identified in 914 and 916. If the aspect ratio at 910 is determined to be greater than a threshold, diagram 900 proceeds to 912. Likewise, from 918, diagram 900 proceeds to 912. At 912, fall event detector 120 determines whether a fall was detected. If not, diagram 900 ends at 922 (i.e., no fall) and a fall is detected, diagram 900 ends at 920.

Figure 10:
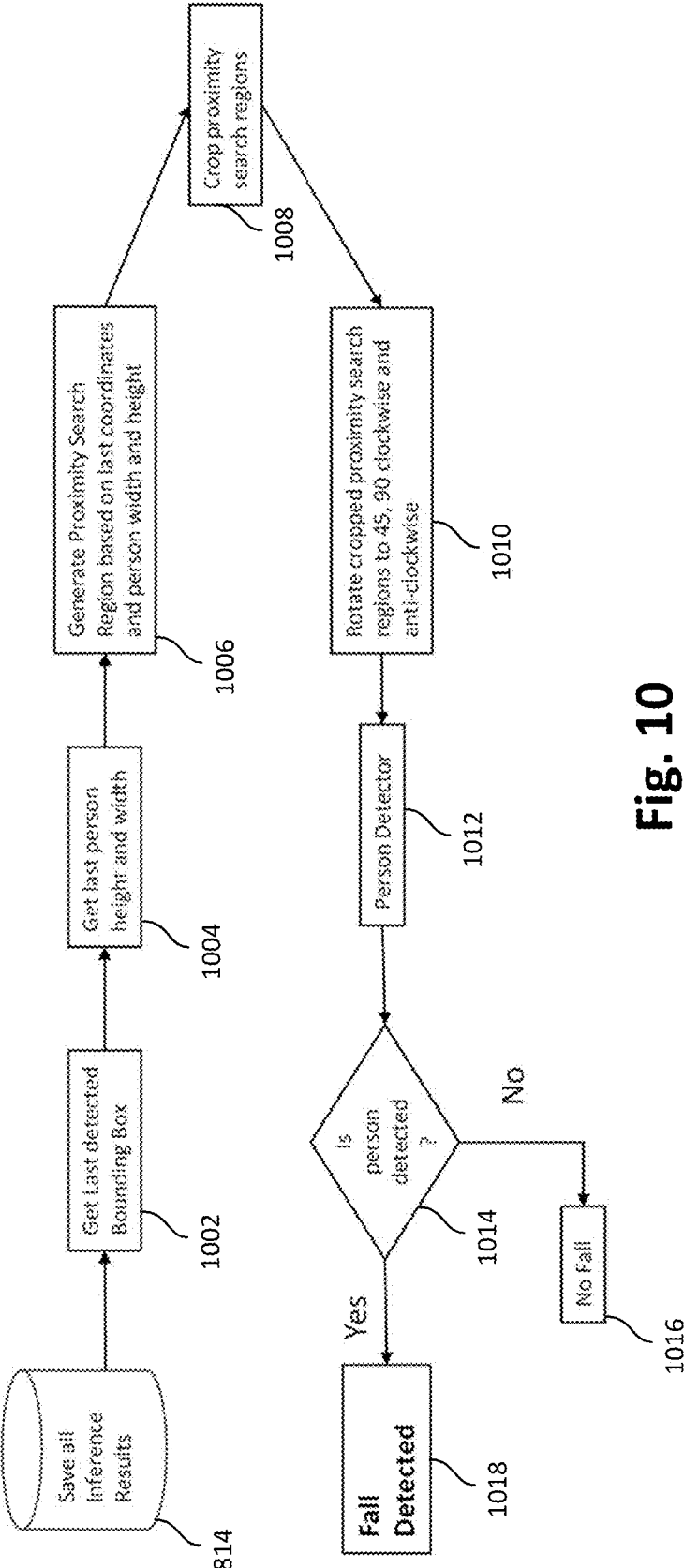
FIG. 10 is a flow diagram for classifying a fall event using a proximity search region, in accordance with exemplary aspects of the present disclosure.

FIG. 10 is a flow diagram 1000 for classifying a fall event using a proximity search region, in accordance with exemplary aspects of the present disclosure. If a person that is initially detected during a fall event is no longer detectable (e.g., the person moves in a position where a person detection algorithm cannot identify them), the steps of diagram 1000 are initiated after the steps of diagram 800. At 1002, fall event detector 120 retrieves the last detected bounding box. At 1004, fall event detector 120 determines that height and width of the person in the bounding box. At 1006, fall event detector 120 generates one or more proximity search regions based on the last known coordinates and determined height and width of the person. At 1008, fall event detector 120 crops the frame based on the proximity search regions. At 1010, fall event detector 120 rotates the cropped frames clockwise/anti-clockwise by 45 and/or 90 degrees. After applying each rotation, fall event detector 120 executes person detector 1012. At 1014, fall event detector 120 determines whether the person is detected. If detected, fall event detector 120 determines that the fall is detected at 1018. Otherwise, no fall is detected at 1016.

Figure 11:
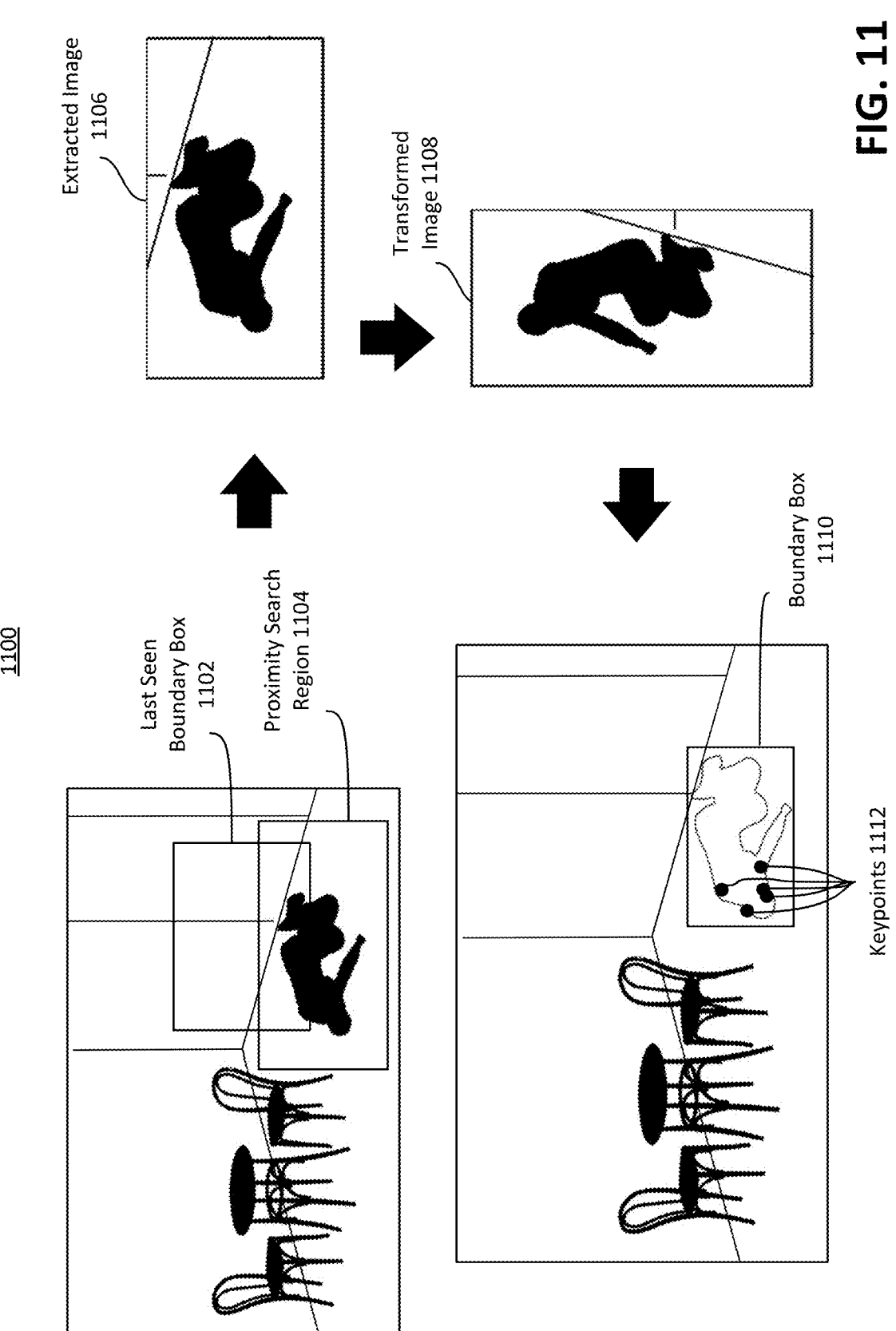
FIG. 11 is a diagram for detecting a person using a proximity search region, in accordance with exemplary aspects of the present disclosure.

FIG. 11 is a diagram for detecting a person using a proximity search region, in accordance with exemplary aspects of the present disclosure. In FIG. 7, it is visible that the person in snapshot 600 has fallen. However, depending on the orientation of the person and whether certain features (e.g., face, torso, foot, etc.) are visible, a person detection model may fail to detect the person. In FIG. 11, suppose that the person detection model is unable to detect the fallen person. Fall event detector 120 may identify the last seen boundary box 1102 (e.g., the boundary box in a previous frame such as the one shown in snapshot 600) and generate proximity search region 1104 in a neighboring area of the image. The proximity search region 1104 focuses the analysis on a specific region of interest that can potentially improve detection of the person.

Fall event detector 120 may crop extracted image 1106 (i.e., the pixel contents of proximity search region 1104) and apply transformations (e.g., rotations clockwise and counterclockwise by 45 degrees and 90 degrees). These transformation(s) result in transformed image 1108, on which fall event detector 120 applies the person detection algorithm. In response to detecting the person in transformed image 1108, the person is marked using boundary box 1110 in the original image (e.g., snapshot 700) and keypoints 1112 are generated as discussed before.

Figure 12:
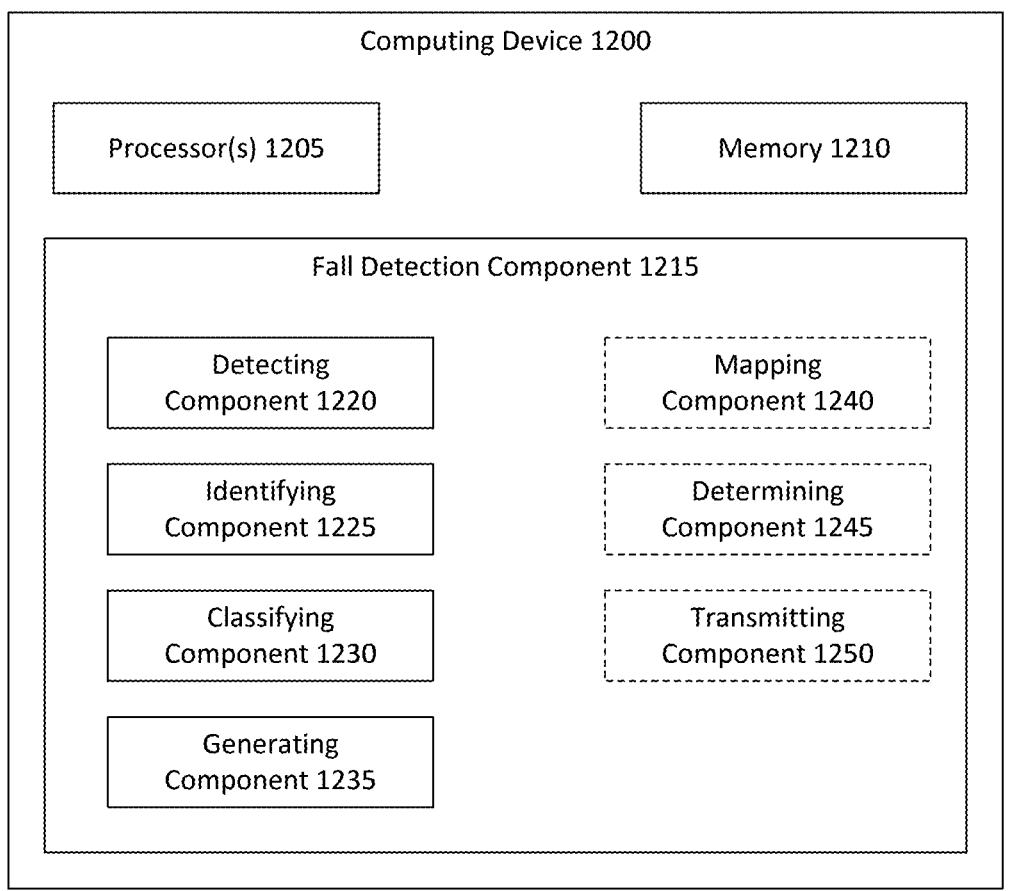
FIG. 12 is a block diagram of an example of a computer device having components configured to perform a method for computer vision detection of a fall event.

Referring to FIG. 12 and FIG. 13, in operation, computing device 1200 may perform a method 1300 for computer vision detection of a fall event, by such as via execution of fall detection component 1215 by one or more processors 1205 and/or one or more memories 1210. It should be noted that computing device 1200 may correspond to computing device 200. For example, processor(s) 1205 corresponds to processor 202, and memory 1210 corresponds to memory 203. Fall detection component 1215 corresponds to fall event detector 120 such that fall detection component 1215 may execute object detector 212 (e.g., via detecting component 1220), bounding box generator 214 (e.g., via detecting component 1220), pose estimator 216 (e.g., via identifying component 1225 and classifying component 1230), pose keypoint projector 218, and analyzer 220 (e.g., via generating component 1235).

At block 1302, the method 1300 includes detecting a person in a first image captured at a first time. For example, in an aspect, computing device 1200, one or more processors 1205, one or more memories 1210, fall detection component 1215, and/or detecting component 1220 may be configured to or may comprise means for detecting a person in a first image captured at a first time.

Suppose that the first image is the image shown in FIG. 5. Fall detection component 1215 may detect the person shown in FIG. 5 using computer vision and/or machine learning techniques (e.g., object classification).

At block 1304, the method 1300 includes identifying a first plurality of keypoints on the person in the first image, wherein the first plurality of keypoints, when connected, indicate a pose of the person. For example, in an aspect, computing device 1200, one or more processors 1205, one or more memories 1210, fall detection component 1215, and/or identifying component 1225 may be configured to or may comprise means for identifying a first plurality of keypoints on the person in the first image, wherein the first plurality of keypoints, when connected, indicate a pose of the person. For example, fall detection component 1215 may detect keypoints 506 (e.g., using a keypoint detection computer vision algorithm).

At block 1306, the method 1300 includes classifying, using the first plurality of keypoints, the pose as a standing pose in response to determining that keypoints of the first plurality of keypoints associated with shoulders of the person are lower than keypoints of the first plurality of keypoints associated with eyes and ears of the person. For example, in an aspect, computing device 1200, one or more processors 1205, one or more memories 1210, fall detection component 1215, and/or classifying component 1230 may be configured to or may comprise means for classifying, using the first plurality of keypoints, the pose as a standing pose in response to determining that keypoints of the first plurality of keypoints associated with shoulders of the person are lower than keypoints of the first plurality of keypoints associated with eyes and ears of the person.

For example, in FIG. 5, the keypoints associated with the shoulders are lower than the keypoints associated with the eyes and ears of the person. Accordingly, fall detection component 1215 determines that the person is standing.

At block 1308, the method 1300 includes detecting the person in a second image captured at a second time. For example, in an aspect, computing device 1200, one or more processors 1205, one or more memories 1210, fall detection component 1215, and/or detecting component 1230 may be configured to or may comprise means for detecting the person in a second image captured at a second time.

Suppose that the second image is the image shown in FIG. 7. Fall detection component 1215 may detect the person in FIG. 7.

At block 1310, the method 1300 includes identifying a second plurality of keypoints on the person in the second image. For example, in an aspect, computing device 1200, one or more processors 1205, one or more memories 1210, fall detection component 1215, and/or identifying component 1230 may be configured to or may comprise means for identifying a second plurality of keypoints on the person in the second image.

For example, fall detection component 1215 may identify several keypoints on the person in FIG. 7. Those keypoints may include shoulder keypoints 704 and ears and eyes keypoints 702.

At block 1312, the method 1300 includes detecting, using the second plurality of keypoints, that the person has fallen in response to determining that, subsequent to the pose being the standing pose in the first image, the keypoints of the second plurality of keypoints associated with the shoulders of the person are higher than the keypoints of the second plurality of keypoints associated with the eyes and the ears of the person in the second image. For example, in an aspect, computing device 1200, one or more processors 1205, one or more memories 1210, fall detection component 1215, and/or detecting component 1230 may be configured to or may comprise means for detecting, using the second plurality of keypoints, that the person has fallen in response to determining that, subsequent to the pose being the standing pose in the first image, the keypoints of the second plurality of keypoints associated with the shoulders of the person are higher than the keypoints of the second plurality of keypoints associated with the eyes and the ears of the person in the second image.

For example, fall detection component 1215 may determine that at least one of the Y-coordinates of the shoulder keypoints 704 is lower than at least one of the Y-coordinates of ears and eyes keypoints 702. Based on this logic, fall detection component 1215 determines that the person has fallen.

At block 1314, the method 1300 includes generating an alert indicating that the person has fallen. For example, in an aspect, computing device 1200, one or more processors 1205, one or more memories 1210, fall detection component 1215, and/or generating component 1235 may be configured to or may comprise means for generating an alert indicating that the person has fallen. For example, the alert may be generated on a graphical user interface of fall detection component 1215 on computing device 1200. In some aspects, the alert is transmitted to a different computing device (e.g., a smartphone) belonging to security personnel, an emergency contact, a housekeeper, etc.

Referring to FIG. 14, in an alternative or additional aspect, at block 1402, the method 1300 may further include mapping the first plurality of keypoints to a one-dimensional line based on each respective vertical component of the first plurality of keypoints. For example, in an aspect, computing device 1200, one or more processors 1205, one or more memories 1210, fall detection component 1215, and/or mapping component 1240 may be configured to or may comprise means for mapping the first plurality of keypoints to a one-dimensional line based on each respective vertical component of the first plurality of keypoints.

For example, the first plurality of keypoints may be mapped by taking the Y-coordinates of the keypoint and place them in a line along the Y-axis. Suppose that the coordinates of a keypoint are given by (X,Y). If the shoulder keypoint is (300, 400), which indicates that the keypoint is located 300 pixels to the right and 400 pixels above of the origin point (0,0) of an image (where the origin point is the bottom leftmost point in the image), the Y-coordinate extracted is 400. Referring to FIG. 5, the Y-coordinates of keypoints 506 are mapped along the Y-axis and shown as keypoint projections 508.

In this optional aspect, at block 1404, the method 1300 may further include determining, based on the one-dimensional line, a first distance between a highest keypoint and a lowest keypoint of the first plurality of keypoints. For example, in an aspect, computing device 1200, one or more processors 1205, one or more memories 1210, fall detection component 1215, and/or determining component 1245 may be configured to or may comprise means for determining, based on the one-dimensional line, a first distance between a highest keypoint and a lowest keypoint of the first plurality of keypoints.

For example, the Y-coordinate value of the highest keypoint may be 1020 and the Y-coordinate value of the lowest keypoint may be 100. The first distance is therefore 920 pixels.

In this optional aspect, at block 1406, the method 1300 may further include classifying the pose as the standing pose further in response to the first distance being greater than a threshold distance. For example, in an aspect, computing device 1200, one or more processors 1205, one or more memories 1210, fall detection component 1215, and/or classifying component 1230 may be configured to or may comprise means for classifying the pose as the standing pose further in response to the first distance being greater than a threshold distance.

The threshold distance may be a preset value stored in memory 1210. For example, the threshold distance may be 500 pixels. In this case, fall detection component 1215 may determine that 920 exceeds 500 and therefore the person is standing in FIG. 5.

In this optional aspect, at block 1408, the method 1300 may further include mapping the second plurality of keypoints to the one-dimensional line based on each respective vertical component of the second plurality of keypoints. For example, in an aspect, computing device 1200, one or more processors 1205, one or more memories 1210, fall detection component 1215, and/or mapping component 1240 may be configured to or may comprise means for mapping the second plurality of keypoints to the one-dimensional line based on each respective vertical component of the second plurality of keypoints.

In this optional aspect, at block 1410, the method 1300 may further include determining, based on the one-dimensional line, a second distance between a highest keypoint and a lowest keypoint of the second plurality of keypoints. For example, in an aspect, computing device 1200, one or more processors 1205, one or more memories 1210, fall detection component 1215, and/or determining component 1245 may be configured to or may comprise means for determining, based on the one-dimensional line, a second distance between a highest keypoint and a lowest keypoint of the second plurality of keypoints.

Referring to FIG. 7, the Y-coordinate value of the highest keypoint may be 400 and the Y-coordinate value of the lowest keypoint may be 70. The second distance is thus 330 pixels.

In this optional aspect, at block 1412, the method 1300 may further include detecting that the person has fallen in response to determining that the first distance is greater than the threshold distance and the second distance is not greater than the threshold distance. For example, in an aspect, computing device 1200, one or more processors 1205, one or more memories 1210, fall detection component 1215, and/or detecting component 1220 may be configured to or may comprise means for detecting that the person has fallen in response to determining that the first distance is greater than the threshold distance and the second distance is not greater than the threshold distance.

As mentioned previously, the threshold distance may be 500. Because the second distance of 330 is less than this value, fall detection component 1215 may determine that the person has fallen.

Referring to FIG. 15, in an alternative or additional aspect, at block 1502, the method 1300 may further include generating a first boundary box around the person in the first image and a second boundary box around the person in the second image. For example, in an aspect, computing device 1200, one or more processors 1205, one or more memories 1210, fall detection component 1215, and/or generating component 1245 may be configured to or may comprise means for generating a first boundary box around the person in the first image and a second boundary box around the person in the second image.

For example, the first image may be the image in FIG. 5 and the second image may be the image in FIG. 11. The first boundary box may be boundary box 504 and the second boundary box may be boundary box 1110. It should be noted that the size of a boundary box may be set such that the size of the person is maximized in the boundary box without exceeding the limits of the boundary box.

In an alternative or additional aspect, classifying the pose as the standing pose is further in response to determining that an aspect ratio of the first boundary box is greater than a threshold aspect ratio. For example, boundary box 504 may have a width of 300 pixels and a length of 800 pixels. The aspect ratio is thus 800/300=2.7. The threshold aspect ratio may be 1. Fall detection component 1215 may thus determine that because 2.7 is larger than 1, the person is standing in FIG. 5.

In an alternative or additional aspect, detecting that the person has fallen is further in response to determining that an aspect ratio of the second boundary box is not greater than a threshold aspect ratio. For example, boundary box 504 may have a width of 700 pixels and a length of 300 pixels. The aspect ratio is thus 300/700=0.43. Here, fall detection component 1215 may thus determine that because 0.43 is not greater than 1, the person is in a fallen position in FIG. 11.

In this optional aspect, at block 1504, the detecting at block 1302 of the person in the second image captured at the second time further includes determining that a person detection model has failed to detect the person in the second image. For example, because the person has fallen and some keypoints may be obscured or undetected, the person may not be detected in FIG. 11.

In this optional aspect, at block 1506, the detecting at block 1302 of the person in the second image captured at the second time further includes generating at least one proximity search region based on coordinates and dimensions of the first boundary box in response to determining that the first boundary box is a latest boundary box generated for the person.

In an alternative or additional aspect, an area of the at least one proximity search region matches an area of the first boundary box, and wherein a center point of the at least one proximity search region is within a threshold distance from a center point of the first boundary box.

For example, the latest boundary box may be last seen boundary box 1102. This is the last boundary box that the person was detected in before going undetected. For example, last seen boundary box 1102 may be the bounding box shown in FIG. 6. Using the dimensions of last seen boundary box 1102, fall detection component 1215 may generate proximity search region 1104. For example, proximity search region 1104 may share the shape of last seen boundary box 1102. Fall detection component 1215 may set the size of proximity search region 1104 to be proportional to last seen boundary box 1102 (e.g., 1× size, 2× size, etc.). Fall detection component 1215 may further place proximity search region 1104 in an area of the image where the person is not detected because on the position of the last seen boundary box 1102. For example, proximity search region 1104 may first be placed in the vicinity of last seen boundary box 1102 (e.g., shifted by a preset amount such as 100 pixels lower and 50 pixels to the right relative to the origin point). Fall detection component 1215 may keep shifting proximity search region 1104 until the person is detected or until the person cannot be detected despite shifting the region a threshold number of times.

In this optional aspect, at block 1508, the detecting at block 1302 of the person in the second image captured at the second time further includes generating at least one input image by cropping the second image to the at least one proximity search region. For example, fall detection component 1215 may place proximity search region 1104 as shown in FIG. 11 and crop the image to produce extracted image 1106.

In this optional aspect, at block 1510, the detecting at block 1302 of the person in the second image captured at the second time further includes applying a rotation to the at least one input image. For example, fall detection component 1215 may rotate extracted image 1106 90 degrees clockwise to produce transformed image 1108.

In this optional aspect, at block 1512, the detecting at block 1302 of the person in the second image captured at the second time further includes detecting the person in the at least one input image after the rotation is applied.

For example, after applying the rotation, the person detection algorithm used by fall detection component 1215 may detect the fallen person in transformed image 1108.

Figure 16:
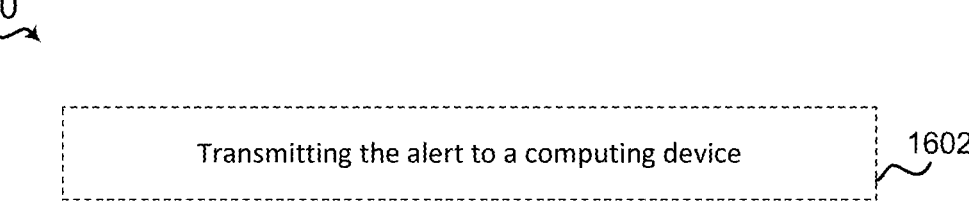
FIG. 16 is a flowchart of additional aspects of the method of FIG. 13.

Referring to FIG. 16, in an alternative or additional aspect, at block 1602, the method 1300 may further include transmitting the alert to a computing device. For example, in an aspect, computing device 1200, one or more processors 1205, one or more memories 1210, fall detection component 1215, and/or transmitting component 1250 may be configured to or may comprise means for transmitting the alert to a computing device. For example, the alert may be an audio alert on a smart speaker, an email, a text message, a notification on an application, etc., on a smartphone, desktop computer, laptop, tablet, etc.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. An apparatus for computer vision detection of a fall event, comprising:
    at least one memory; and
    at least one processor coupled with the at least one memory and configured, individually or in combination, to:
        detect a person in a first image captured at a first time;
        identify a first plurality of keypoints on the person in the first image, wherein the first plurality of keypoints, when connected, indicate a pose of the person, wherein a location of each keypoint has a horizontal component and a vertical component;
        classify, using the first plurality of keypoints, the pose as a standing pose in response to determining that keypoints of the first plurality of keypoints associated with shoulders of the person are lower than keypoints of the first plurality of keypoints associated with eyes and ears of the person;
        detect the person in a second image captured at a second time;
        identify a second plurality of keypoints on the person in the second image;
        map the first plurality of keypoints to a one-dimensional line based on each respective vertical component of the first plurality of keypoints;
        determine, based on the one-dimensional line, a first distance between a highest keypoint and a lowest keypoint of the first plurality of keypoints;
        map the second plurality of keypoints to the one-dimensional line based on each respective vertical component of the second plurality of keypoints;
        determine, based on the one-dimensional line, a second distance between a highest keypoint and a lowest keypoint of the second plurality of keypoints; and
        detect that the person has fallen in response to determining that the first distance is greater than a threshold distance and the second distance is not greater than the threshold distance;
        generate an alert indicating that the person has fallen.

2. The apparatus of claim 1, wherein the at least one processor is further configured to:
    classify the pose as the standing pose further in response to the first distance being greater than the threshold distance.

3. The apparatus of claim 1, wherein the at least one processor is further configured to generate a first boundary box around the person in the first image and a second boundary box around the person in the second image.

4. The apparatus of claim 3, wherein to classify the pose as the standing pose is further in response to determining that an aspect ratio of the first boundary box is greater than a threshold aspect ratio.

5. The apparatus of claim 3, wherein to detect that the person has fallen is further in response to determining that an aspect ratio of the second boundary box is not greater than a threshold aspect ratio.

6. The apparatus of claim 3, wherein to detect the person in the second image captured at the second time the at least one processor is further configured to:
    determine that a person detection model has failed to detect the person in the second image;
    generate at least one proximity search region based on coordinates and dimensions of the first boundary box in response to determine that the first boundary box is a latest boundary box generated for the person;
    generate at least one input image by cropping the second image to the at least one proximity search region;
    apply a rotation to the at least one input image; and
    detect the person in the at least one input image after the rotation is applied.

7. The apparatus of claim 6, wherein an area of the at least one proximity search region matches an area of the first boundary box, and wherein a center point of the at least one proximity search region is within a threshold distance from a center point of the first boundary box.

8. The apparatus of claim 1, wherein the at least one processor is further configured to transmit the alert to a compute device.

9. A method for computer vision detection of a fall event, comprising:
    detecting a person in a first image captured at a first time;
    identifying a first plurality of keypoints on the person in the first image, wherein the first plurality of keypoints, when connected, indicate a pose of the person, wherein a location of each keypoint has a horizontal component and a vertical component;
    classifying, using the first plurality of keypoints, the pose as a standing pose in response to determining that keypoints of the first plurality of keypoints associated with shoulders of the person are lower than keypoints of the first plurality of keypoints associated with eyes and ears of the person;
    detecting the person in a second image captured at a second time;
    identifying a second plurality of keypoints on the person in the second image;
    mapping the first plurality of keypoints to a one-dimensional line based on each respective vertical component of the first plurality of keypoints;
    determining, based on the one-dimensional line, a first distance between a highest keypoint and a lowest keypoint of the first plurality of keypoints;
    mapping the second plurality of keypoints to the one-dimensional line based on each respective vertical component of the second plurality of keypoints;

determining, based on the one-dimensional line, a second distance between a highest keypoint and a lowest keypoint of the second plurality of keypoints; and detecting that the person has fallen in response to determining that the first distance is greater than a threshold distance and the second distance is not greater than the threshold distance; and generating an alert indicating that the person has fallen.

10. The method of claim 9, further comprising:

classifying the pose as the standing pose further in response to the first distance being greater than the threshold distance.

11. The method of claim 9, further comprising generating a first boundary box around the person in the first image and a second boundary box around the person in the second image.

12. The method of claim 11, wherein classifying the pose as the standing pose is further in response to determining that an aspect ratio of the first boundary box is greater than a threshold aspect ratio.

13. The method of claim 11, wherein detecting that the person has fallen is further in response to determining that an aspect ratio of the second boundary box is not greater than a threshold aspect ratio.

14. The method of claim 11, wherein detecting the person in the second image captured at the second time further comprises:

determining that a person detection model has failed to detect the person in the second image;

generating at least one proximity search region based on coordinates and dimensions of the first boundary box in response to determining that the first boundary box is a latest boundary box generated for the person;

generating at least one input image by cropping the second image to the at least one proximity search region;

applying a rotation to the at least one input image; and detecting the person in the at least one input image after the rotation is applied.

15. The method of claim 14, wherein an area of the at least one proximity search region matches an area of the first boundary box, and wherein a center point of the at least one proximity search region is within a threshold distance from a center point of the first boundary box.

16. The method of claim 9, further comprising transmitting the alert to a computing device.

17. An apparatus for computer vision detection of a fall event, comprising:

means for detecting a person in a first image captured at a first time;

means for identifying a first plurality of keypoints on the person in the first image, wherein the first plurality of keypoints, when connected, indicate a pose of the person;

means for classifying, using the first plurality of keypoints, the pose as a standing pose in response to determine that keypoints of the first plurality of keypoints associated with shoulders of the person are lower than keypoints of the first plurality of keypoints associated with eyes and ears of the person;

means for detecting the person in a second image captured at a second time;

means for identifying a second plurality of keypoints on the person in the second image;

means for detecting, using the second plurality of keypoints, that the person has fallen in response to determine that, subsequent to the pose being the standing pose in the first image, the keypoints of the second plurality of keypoints associated with the shoulders of the person are higher than the keypoints of the second plurality of keypoints associated with the eyes and the ears of the person in the second image; and means for generating an alert indicating that the person has fallen.

18. A non-transitory computer-readable medium having instructions stored thereon for computer vision detection of a fall event, wherein the instructions are executable by one or more processors, individually or in combination, to:

detect a person in a first image captured at a first time;

identify a first plurality of keypoints on the person in the first image, wherein the first plurality of keypoints, when connected, indicate a pose of the person, wherein a location of each keypoint has a horizontal component and a vertical component;

classify, using the first plurality of keypoints, the pose as a standing pose in response to determining that keypoints of the first plurality of keypoints associated with shoulders of the person are lower than keypoints of the first plurality of keypoints associated with eyes and ears of the person;

detect the person in a second image captured at a second time;

identify a second plurality of keypoints on the person in the second image;

map the first plurality of keypoints to a one-dimensional line based on each respective vertical component of the first plurality of keypoints;

determine, based on the one-dimensional line, a first distance between a highest keypoint and a lowest keypoint of the first plurality of keypoints;

map the second plurality of keypoints to the one-dimensional line based on each respective vertical component of the second plurality of keypoints;

determine, based on the one-dimensional line, a second distance between a highest keypoint and a lowest keypoint of the second plurality of keypoints; and detect that the person has fallen in response to determining that the first distance is greater than a threshold distance and the second distance is not greater than the threshold distance;

generate an alert indicating that the person has fallen.

* * * * *